United States Patent
Bucchi et al.

(10) Patent No.: US 10,776,189 B2
(45) Date of Patent: Sep. 15, 2020

(54) API QUERY

(71) Applicant: MuleSoft, Inc., San Francisco, CA (US)

(72) Inventors: Aldo Bucchi, San Francisco, CA (US); Antonio Garrote, London (GB)

(73) Assignee: Mulesoft, Inc., San Francisco, CA (US)

( * ) Notice: Subject to any disclaimer, the term of this patent is extended or adjusted under 35 U.S.C. 154(b) by 66 days.

(21) Appl. No.: 16/007,354

(22) Filed: Jun. 13, 2018

(65) Prior Publication Data

US 2019/0196890 A1 Jun. 27, 2019

Related U.S. Application Data

(60) Provisional application No. 62/609,657, filed on Dec. 22, 2017.

(51) Int. Cl.

| | | |
|---|---|---|
| G06F 9/54 | (2006.01) | |
| G06F 16/951 | (2019.01) | |
| G06F 16/2455 | (2019.01) | |
| G06F 16/2453 | (2019.01) | |
| G06F 16/25 | (2019.01) | |

(52) U.S. Cl.
CPC .......... *G06F 9/547* (2013.01); *G06F 16/2455* (2019.01); *G06F 16/24545* (2019.01); *G06F 16/256* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 9,172,621 B1 * | 10/2015 | Dippenaar | |
| 2001/0004737 A1 * | 6/2001 | Laux | |
| 2015/0161199 A1 * | 6/2015 | Pinko | |
| 2018/0232262 A1 * | 8/2018 | Chowdhury | |
| 2019/0294610 A1 * | 9/2019 | Naidu | |

OTHER PUBLICATIONS

Uri Sarid, Open API and RAML: Better Together, Apr. 27, 2017, pp. 1-5 (Year: 2017).*

* cited by examiner

*Primary Examiner* — Syed A Roni
(74) *Attorney, Agent, or Firm* — Sterne, Kessler, Goldstein & Fox P.L.L.C.

(57) ABSTRACT

A plurality of network application programming interfaces (APIs) are received. The plurality of network APIs are transformed then mapped into a unified data graph. A query in a distributed computing environment is performed using the unified data graph or performing discovery for at least one of the plurality of network APIs using the unified data graph.

23 Claims, 22 Drawing Sheets

GraphQL:
- Popular and modern standard. May leverage existing drivers, libraries, and SDKs without GraphQL service limitations.

SPARQL:
- Popular and mature standard. May leverage existing drivers, libraries, and SDKs.

MGQL:
- REST Service requires no special libraries
- JSON orientation = no need for special libraries

API QUERY

CROSS REFERENCE TO OTHER APPLICATIONS

This application claims priority to U.S. Provisional Patent Application No. 62/609,657 entitled API QUERY filed Dec. 22, 2017 which is incorporated herein by reference for all purposes.

BACKGROUND OF THE INVENTION

Networks including the Internet comprise web, data, and database services. APIs (application programming interfaces) provide techniques for applications to interface with these services. In recent years architectural styles have been employed for APIs to conform to. Programmatically consuming and combining APIs is complex, and there exists a need for a simpler way to interface applications to services.

BRIEF DESCRIPTION OF THE DRAWINGS

Various embodiments of the invention are disclosed in the following detailed description and the accompanying drawings.

DETAILED DESCRIPTION

Figure 1:
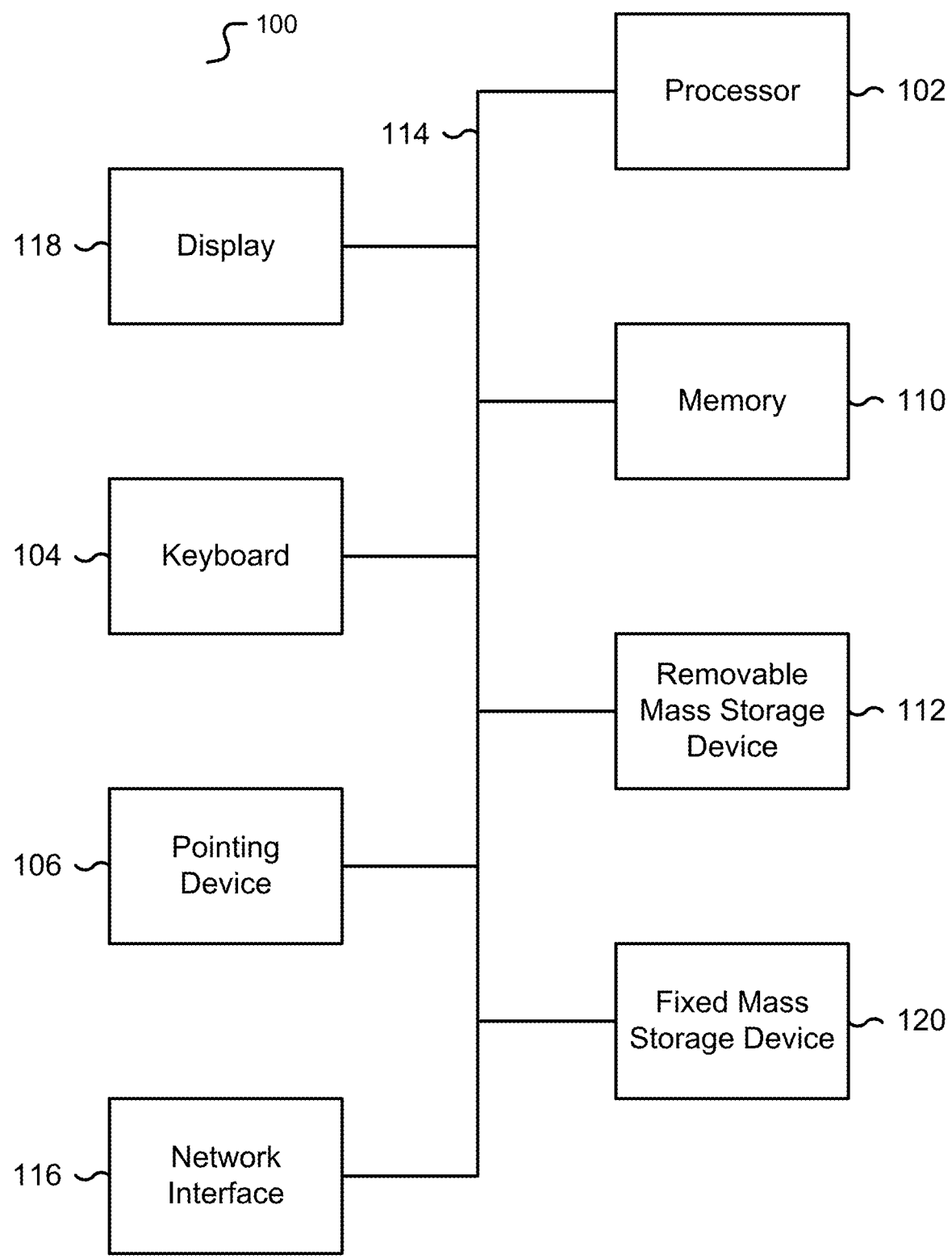
FIG. 1 is a functional diagram illustrating a programmed computer/server system for an API query engine in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An API query engine that supports multiple query languages and API protocols is disclosed. In one embodiment, the API query engine enable querying capabilities on top of APIs that conform to a REST (REpresentational State Transfer) architectural style such as RAML (RESTful API Modeling Language) and OAS (OpenAPI Specification).

In one embodiment, an API query engine is created that takes a declarative query, for example expressed in a graph query language, and resolves it by automatically orchestrating API calls, relieving the developer from manual orchestration. Orchestration as referred to herein refers to the arrangement, coordination, and management of systems and services, for example aligning a business request with applications, data, and/or infrastructure. Extensions may be defined to existing API protocols so the engine understands how to invoke them correctly and efficiently. High level tooling may also be built, including a query editor and a data explorer, that may target different types of API/data consumers.

Because traditionally programmatically consuming and combining REST APIs is complex, querying via an API query engine is an improvement to reduce time to program and/or design the manual orchestration of applications to services. Other traditional approaches like GraphQL recognize this issue and provide a simpler approach, but come with negative tradeoffs such as the fact that GraphQL breaks REST architecture, which may affect large scale composability.

The use of the API query engine parallels the use of SQL (Structured Query Language) for relational databases. An API Query may enable "SQL" like capabilities on top of systems that expose their data via APIs rather than have the systems exposing their underlying databases directly. Providing a unified declarative query mechanism that may be used over any number of unrelated data sources, with associated description meta-data so they may be consumed as a single unified data graph, is disclosed. Developers of composite applications may: discover APIs; read/understand documentation; and understand multiple access mechanisms. A "composite application" as referred to herein is any application that uses a plurality of API, for example an application built by combining multiple existing functions into a new application.

A solution comprising an API query engine processes the declarative information of each data source to build a conceptual unified data graph including: common description of the data shape of each type of data entities in each data source; connections between data types in a single entity; and connections between entities in different repositories. The unified data graph may also include information about the transport layer, such as a HyperText Transfer Protocol (HTTP) request, SQL request though a Java Database Connectivity (JDBC) driver, and/or GraphQL query over the HTTP protocol, that may be performed to extract the data for each particular data resource in a data source.

Different plugins for an API Query mechanism for different types of data sources may provide the mapping mechanism for the new type of data source to participate in the API Query mechanism. An API Query engine may parse a declarative query over the unified data graph as a query algebra expression and may compute a query plan to be executed to extract information from the data sources connected through the unified query plan and/or compose the final answer. Multiple declarative query engines may be used in an API Query as long as the API Query engine is capable of producing a compatible query plan for the query. Meta queries over the structure of the data graph may also be used to discover data sources and their structure.

In one embodiment, an API Query engine resolves a declarative query against a set of APIs. An API Query engine may support multiple Query Languages and multiple API protocols/specifications. In one embodiment, an API Query engine shares some features with a regular SQL/Graph query engine, but may utilize a different approach due to the partial data access provided by APIs, the network latency, and the heterogeneity of the domain.

FIG. 1 is a functional diagram illustrating a programmed computer/server system for an API query engine in accordance with some embodiments. As shown, FIG. 1 provides a functional diagram of a general purpose computer system programmed to provide an API query engine in accordance with some embodiments. As may be apparent, other computer system architectures and configurations can be used for an API query engine.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
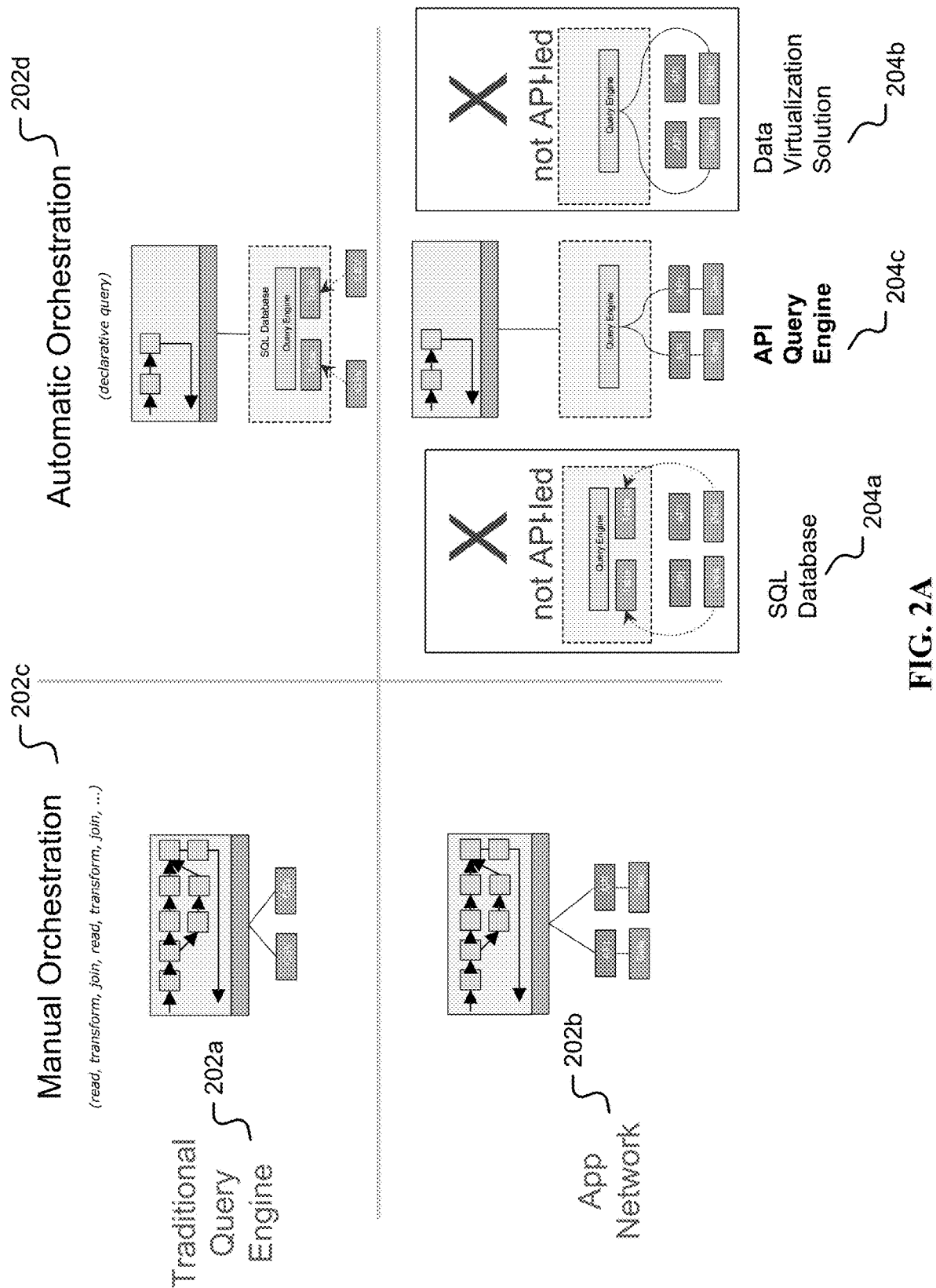
FIG. 2A is an illustration of an API query engine in comparison to traditional approaches.

FIG. 2A is an illustration of an API query engine in comparison to traditional approaches. An API query engine may be compared against two types of traditional engines:
    traditional database query engines such as an SQL/RDBMS, Document or Graph query engine; and
    federated and/or virtual query engines that may delegate work to other query engines. As referred to herein, a federated system is one based on heterogeneous data sources with a unified and/or homogenous interface.

In FIG. 2A, the top row represents approaches using a traditional query engine (202a), while the bottom row represents approaches using an application network (202b). The left column represents approaches using a manual orchestration (202c), while the right column represents approaches using an automatic orchestration (202d). Thus at the intersection of automatic orchestration (202d) for an application network (202b), we have three possibilities: an SQL database approach (204a), a data virtualization solution approach (204b), and the API query engine approach (204c).

In a traditional database (204a), data is owned and managed by the database. This may be achieved via processes such as ETL (Extract Transform Load). In a traditional database (204a), API encapsulation is broken as it is not API led, and data may need to be replicated. With regards to query validation, queries may be resolved if they are valid against a schema. Query performance with traditional databases (204a) are typically best in class.

In a data virtualization solution (204b), using for example a federated query engine, data may stay in its source database/application. Examples of the federated query engine include those related to GraphQL, and/or W3C Hydra with TPF (triple pattern fragments). API encapsulation is still broken; as shown in FIG. 2A an API is bypassed to access the database directly in data virtualization (204b). With regards to query validation, all queries may be resolved if they are valid against the schemas. Query performance with data virtualization (204b) may not be as strong as a traditional database (204a), but in some cases may be pushed down to remote databases.

By contrast, while with an API query engine (204c) data stays in a source database/application like with data virtualization (204b), the API encapsulation is not broken. The API query engine (204c) gains access to the data via the API, leveraging the services provided by the API. By contrast with the traditional database (204a) and data virtualization (204b), with regards to query validation, not all queries are valid; APIs generally only provide partial access to the underlying data model. Likewise, with regards to query performance, performance depends on the access methods provided by the APIs. In a best case scenario it may approximate the performance of a data virtualization solution (204b), but in some cases it may be lower.

The API query engine (204c) makes composite applications easier to build by adding SQL-like capabilities to an application network platform, leveraging, as opposed to breaking, the API-led approach.

As compared to a traditional SQL query engine (204a) and/or a traditional graph query engine (204b), an API query engine (204c) is able to consume data exposed via APIs, whereas a traditional query engine (204a, 204b) may consume data exposed via data-oriented interfaces, in the case of a data virtualization engine (204b), or data managed by the engine itself, in the case of an RDBMS (204a). This has several implications in the design of each engine and the tooling to solve problems that generally do not exist in the case of a traditional query engine (204a, 204b). For example:
    Not all queries are solvable for an API query engine (204c);
    Query planning and execution may take into account latency, API limits, throttling, network errors, and so forth; and/or The data model of different APIs may differ. This may indicate a need for higher level domain-mapping strategies or advanced tooling.

Figure 2B:
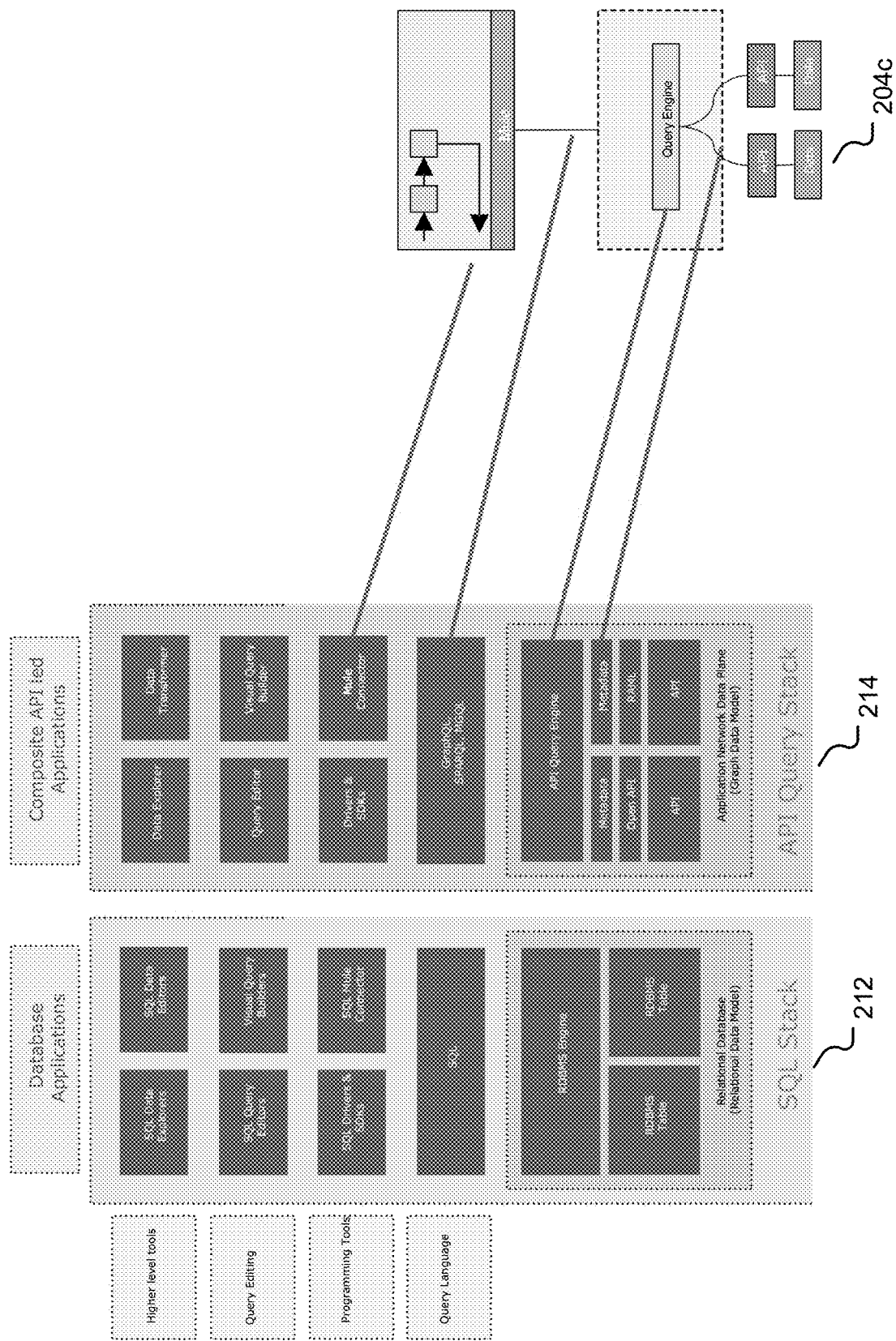
FIG. 2B is an illustration comparing the traditional database stack, such as an SQL stack with an API query stack.

FIG. 2B is an illustration comparing the traditional database (204a) stack, such as an SQL stack (212) with an API query stack (214). The SQL stack (212) for database applications, from the base of the stack includes a relational data model for the relational database including one or more RDBMS (relational database management system) tables and an RDBMS engine. The query language provided is typically SQL and/or a variant. Programming tools include SQL drivers and SDKs. Query editing is provided by SQL query editors and/or visual query builders, and higher level tools include SQL data explorers and SQL data editors.

The API query stack (214) for composite API-led applications, from the base of the stack includes an application network data plane and/or graph data model, including one or more APIs for example in OAS or RAML, with metadata associated with the API and the API query engine (204c). The API query stack (214) may be agnostic to a query language, for example using GraphQL, SPARQL, and/or another declarative graph query language. Similar to the SQL stack (212), programming tools include drivers and SDKs, query editing is provided by a query editor and/or visual query builders, and higher level tools include a data explorer and/or data transformer.

A benefit of an API query engine is its support of more than one query languages and more than one protocols, because:

value of an API query engine is higher when it may help in the resolution of queries against more than one API;

there are multiple API protocols, thus the engine (204c) supports more than one protocol; and for a given protocol, queries may be better described in a particular query language. For example, Template/Document based for JSON style APIs, SPARQL/Graph based for interlinked APIs, and SQL for table oriented APIs. In some cases when multiple protocols are mixed, then the API query engine (204c) may permit a developer to experiment with whichever language best suits their needs and/or use the most general language such as a Graph oriented language.

Figure 2C:
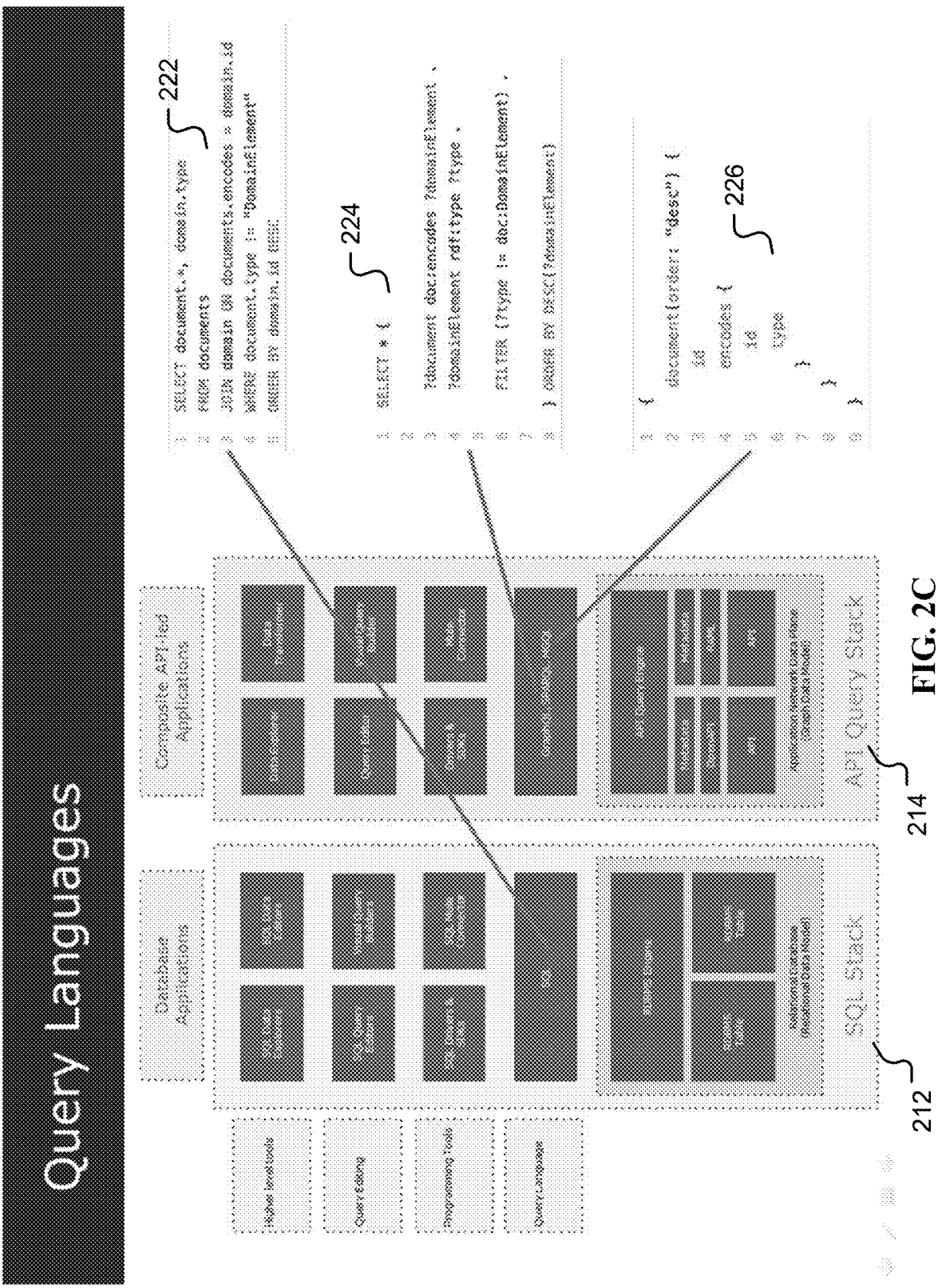
FIG. 2C is an illustration comparing the query language between an SQL stack and API query stack.
Figure 2D:
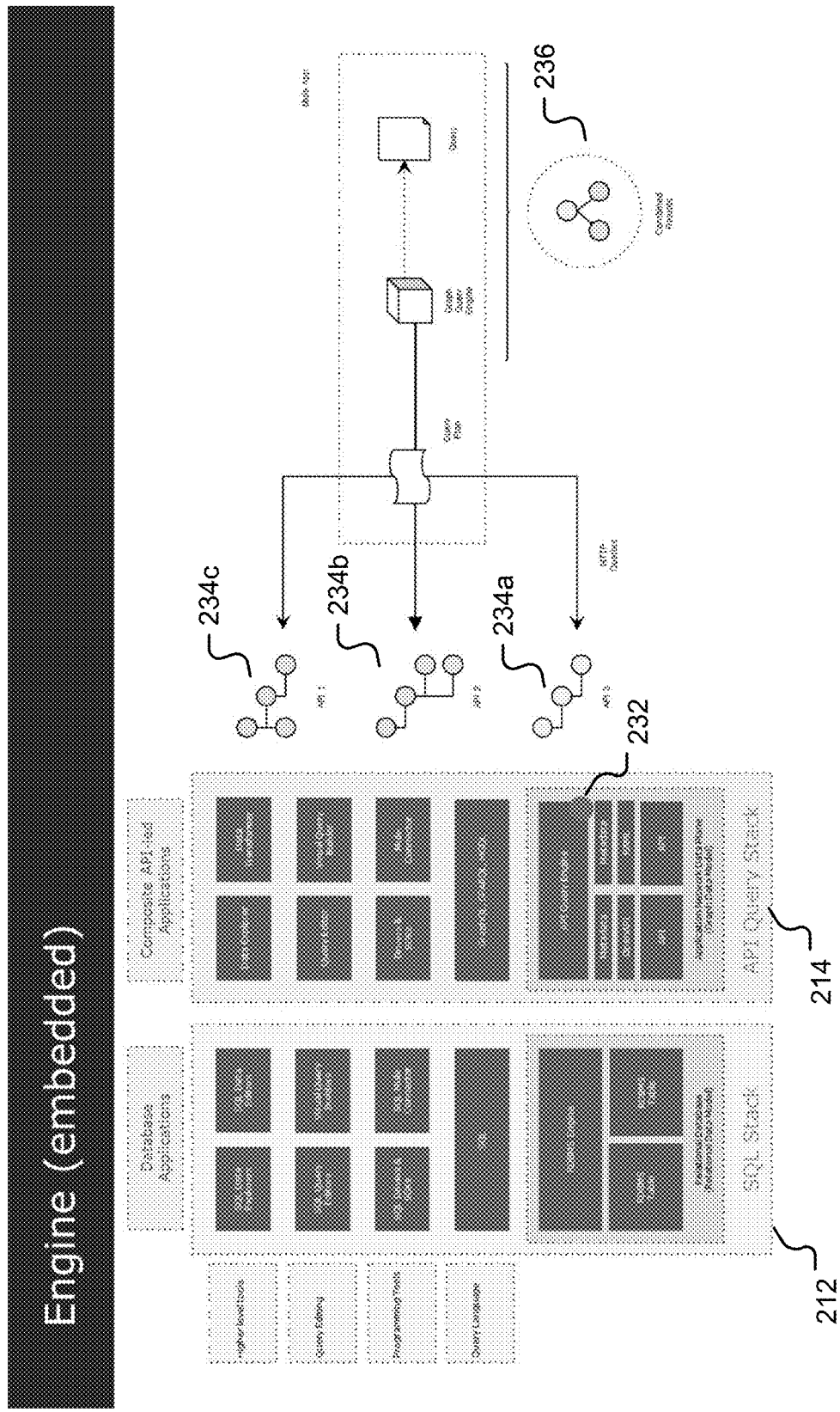
FIG. 2D is an illustration of the API query engine.

FIG. 2C is an illustration comparing the query language between an SQL stack (212) and API query stack (214). An example of SQL (222) is compared to that of SPARQL (224) and GraphQL (226). FIG. 2D is an illustration of the API query engine. The API query engine (232) includes a query plan execution mechanism for an API Query engine executing a query plan computed for a provided declarative query, for example using HTTP requests, using description metadata available in different data sources (234a, 234b, 234c) and combining the results (236) using the graph query engine and/or queries.

Figure 2E:
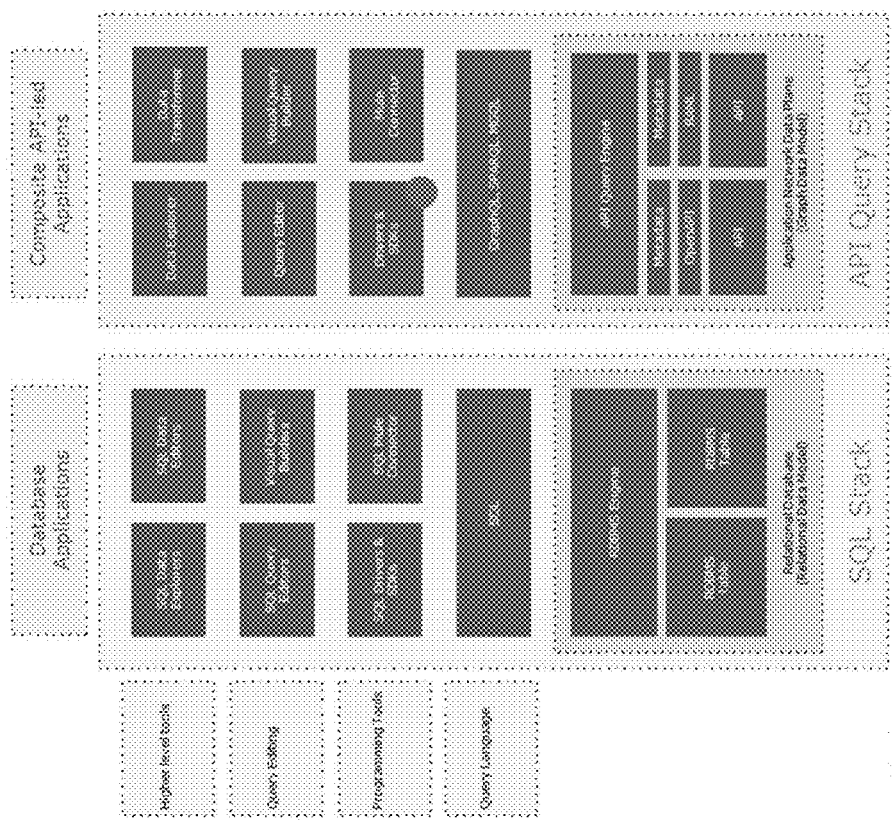
FIG. 2E is an illustration showing examples of query languages and respective programming tools supported.

FIG. 2E is an illustration showing examples of query languages and respective programming tools supported. GraphQL is a popular modern standard that may leverage existing drivers, libraries, and SDKs without GraphQL service limitations. That is, GraphQL may be used as a query language without necessarily using GraphQL as a service. SPARQL is a popular and mature standard that may leverage existing drivers, libraries, and SDKs. Another declarative graph query language may be a REST service requiring no special libraries, for example because of its JSON orientation.

Figure 2F:
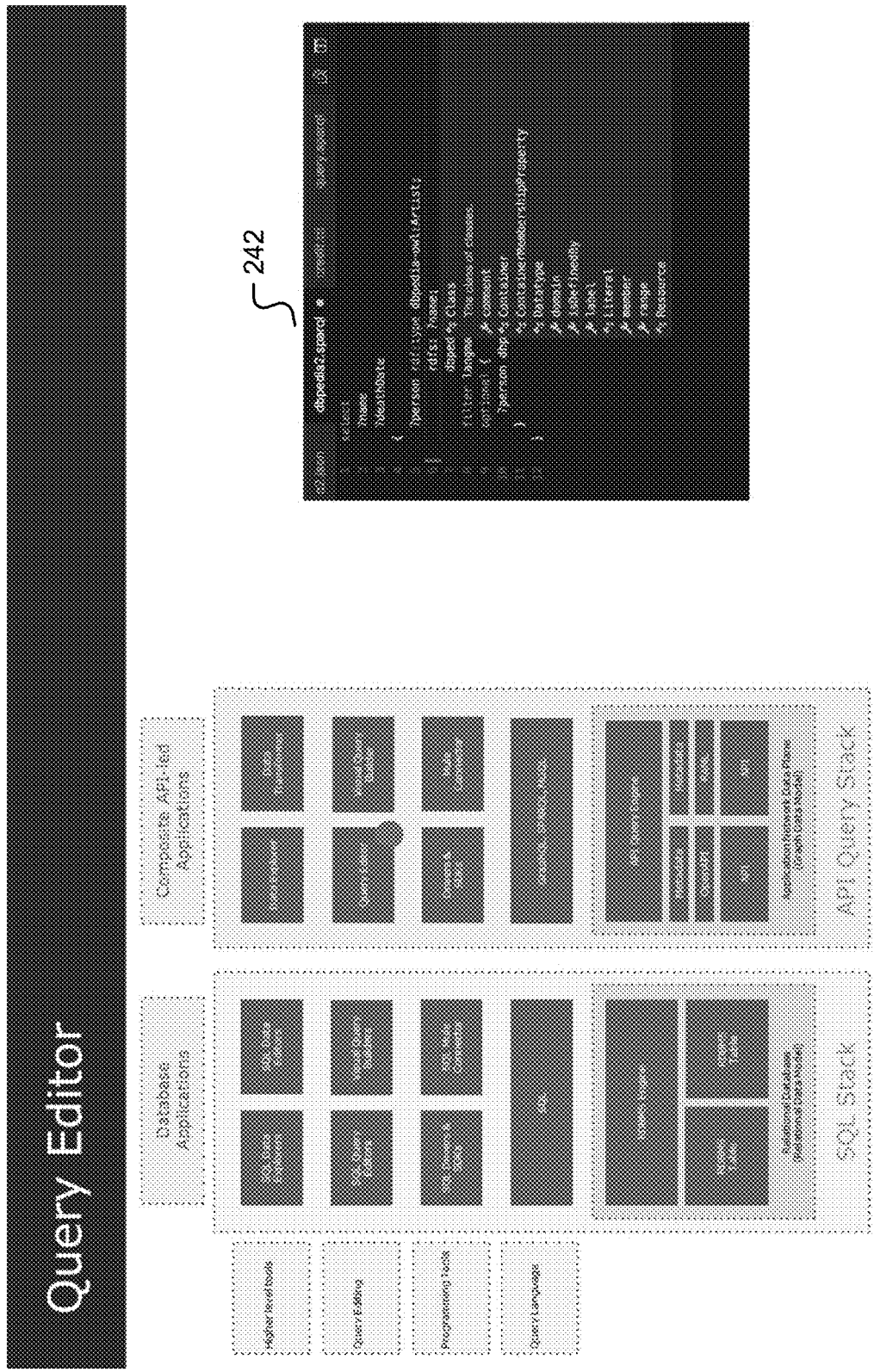
FIG. 2F is an illustration of a query editor for the API query engine.
Figure 2G:
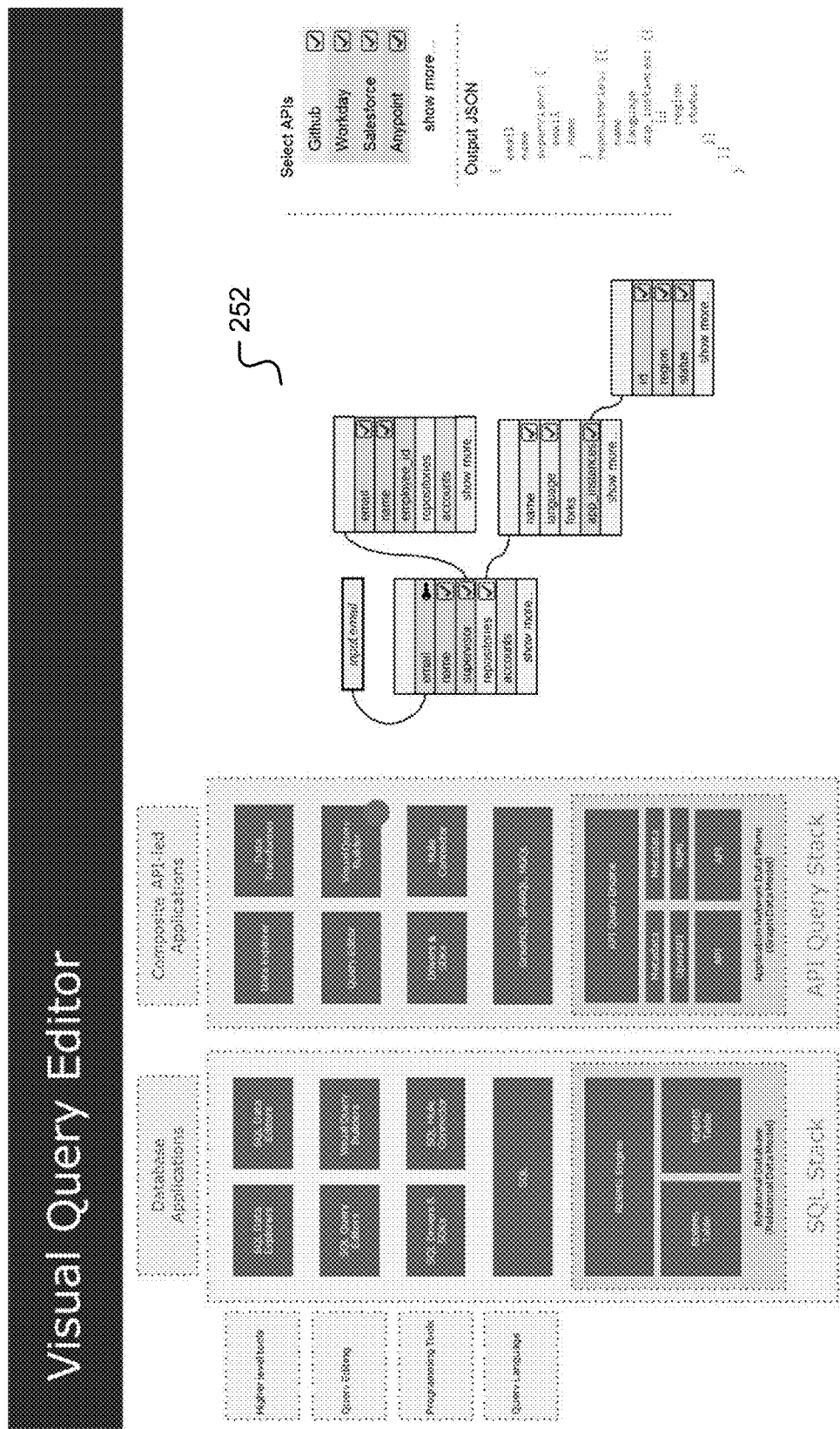
FIG. 2G is an illustration of a visual query editor for the API query engine.
Figure 2H:
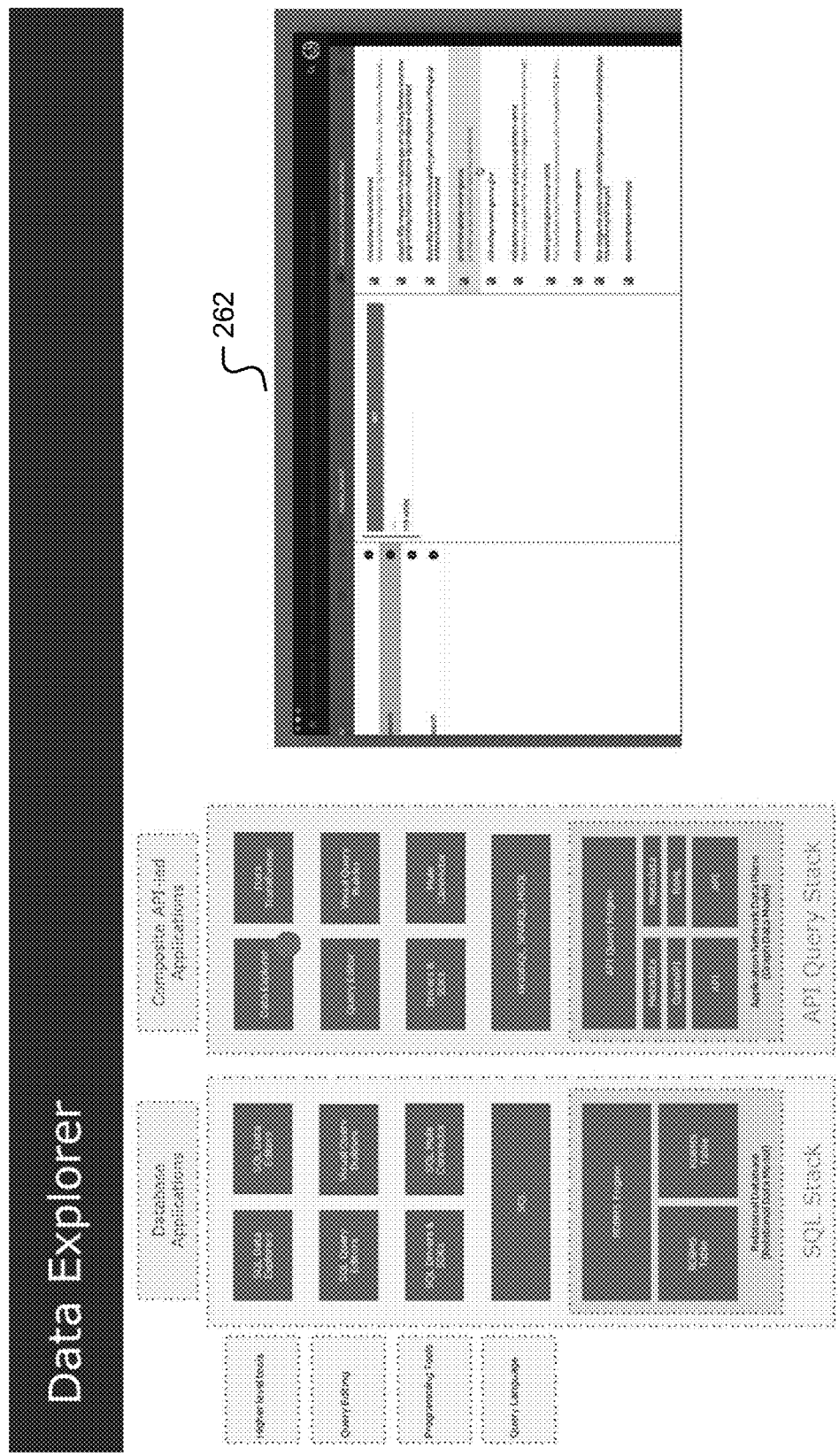
FIG. 2H is an illustration of a data explorer for the API query engine.
Figure 2I:
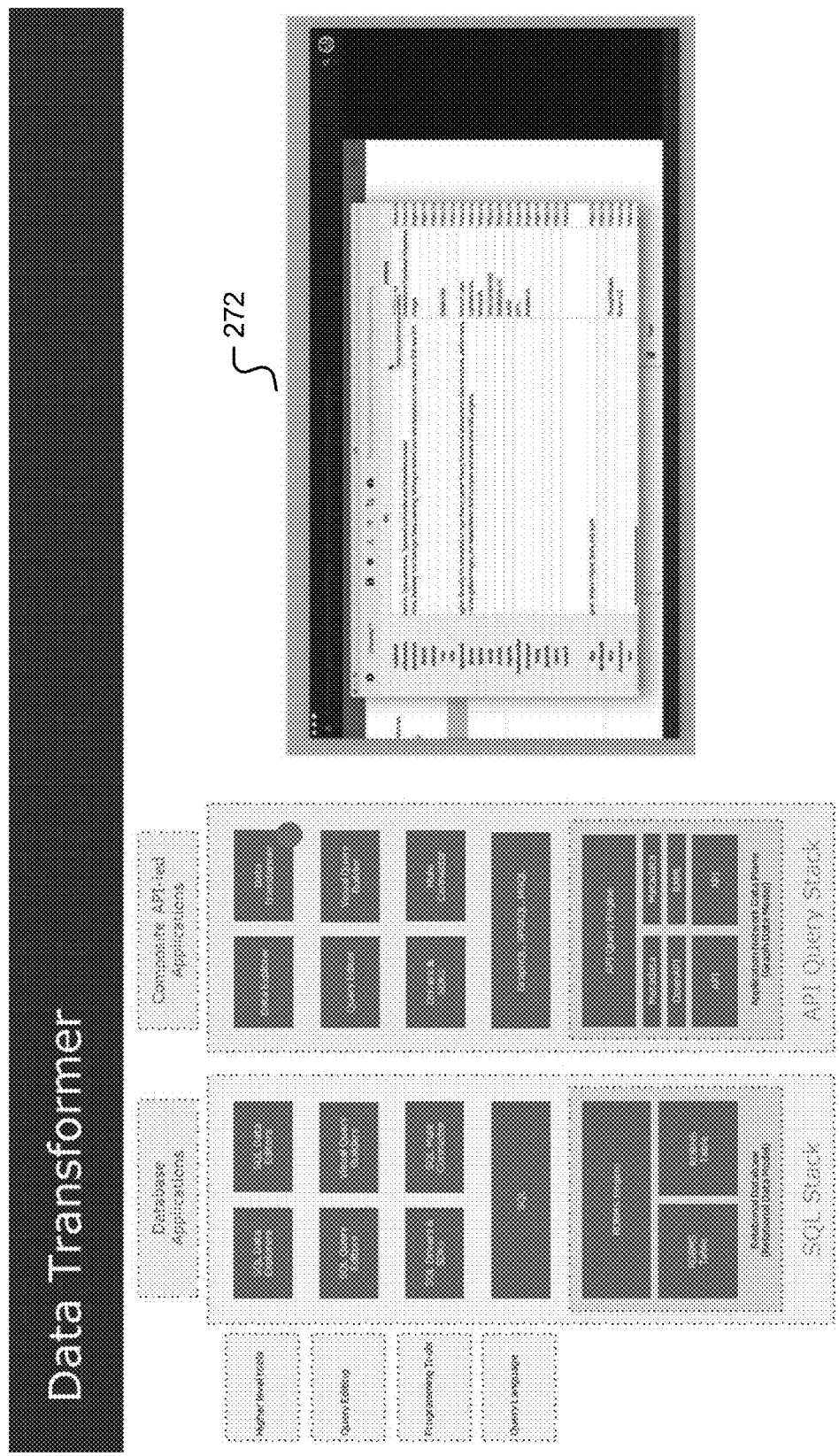
FIG. 2I is an illustration of a data transformer for the API query engine.

FIG. 2F is an illustration of a query editor for the API query engine. A screenshot (242) is given of a sample query editor. FIG. 2G is an illustration of a visual query editor for the API query engine. A screenshot (252) is given of a sample visual query editor. FIG. 2H is an illustration of a data explorer for the API query engine. A screenshot (262) is given of a sample data explorer. A data explorer may enable rendering of a visualization view, for example providing an interface and/or import to a third-party platform such as Tableau for visualization. FIG. 2I is an illustration of a data transformer for the API query engine. A screenshot (272) is given of a sample data transformer.

Figure 2J:
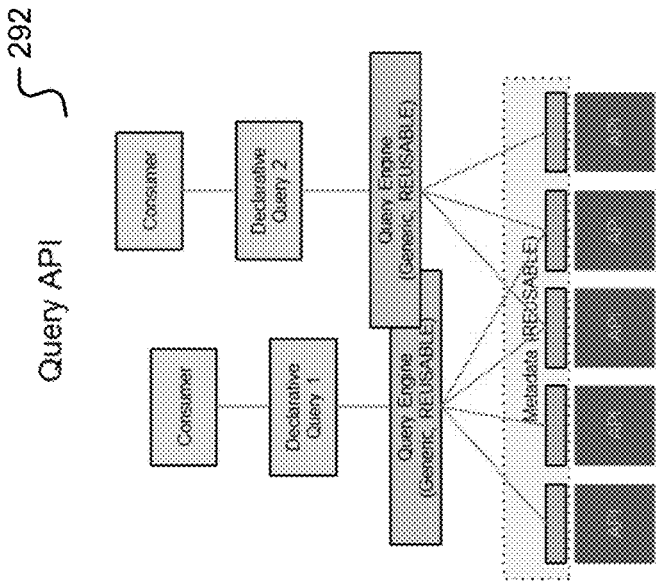
FIG. 2J is an illustration of a comparison between GraphQL and the query API.
Figure 2J:
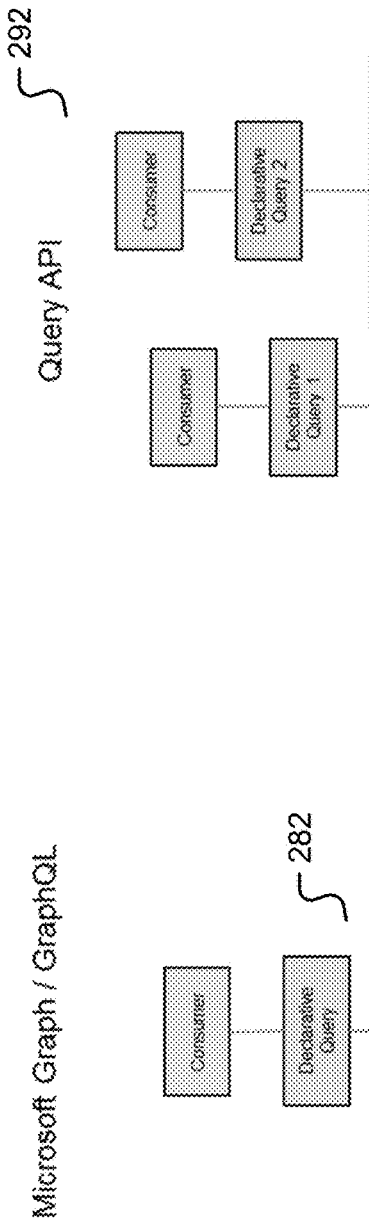

FIG. 2J is an illustration of a comparison between GraphQL and the query API. For a GraphQL and/or Microsoft Graph approach (282) a consumer may use a declarative query to a Microsoft Graph and/or GraphQL powered process API. When accessing source data with its own REST API such as RAML and/or OAS, unfortunately custom non reusable code must be crafted to use the Microsoft Graph and/or GraphQL powered process API. This approach breaks REST and/or resource architecture, and is based on a custom built monolith in Microsoft Graph and/or GraphQL. Without reusability, the graph approach (282) requires more time and/or resources and/or debug/development time and may not leverage services provided by the author of the service. It can thus only integrate APIs included by the monolith graph API developer.

By contrast, an API query engine approach (292) is REST friendly. As with the graph approach (282) a consumer may still use a declarative query to the API query engine (232). In FIG. 2J two instances of the API query engine (232) are used, showing the scalability of the approach. One difference between the graph approach and the API query engine approach (292) is that by being REST friendly it works with the existing API specifications of the services, decoupling the query from the engine from the metadata. Thus, most logic and code is reusable, saving time and/or resources and/or debug/development time. Because it uses the API from a proprietary service provider, it may work across nearly any API from different providers.

Figure 3A:
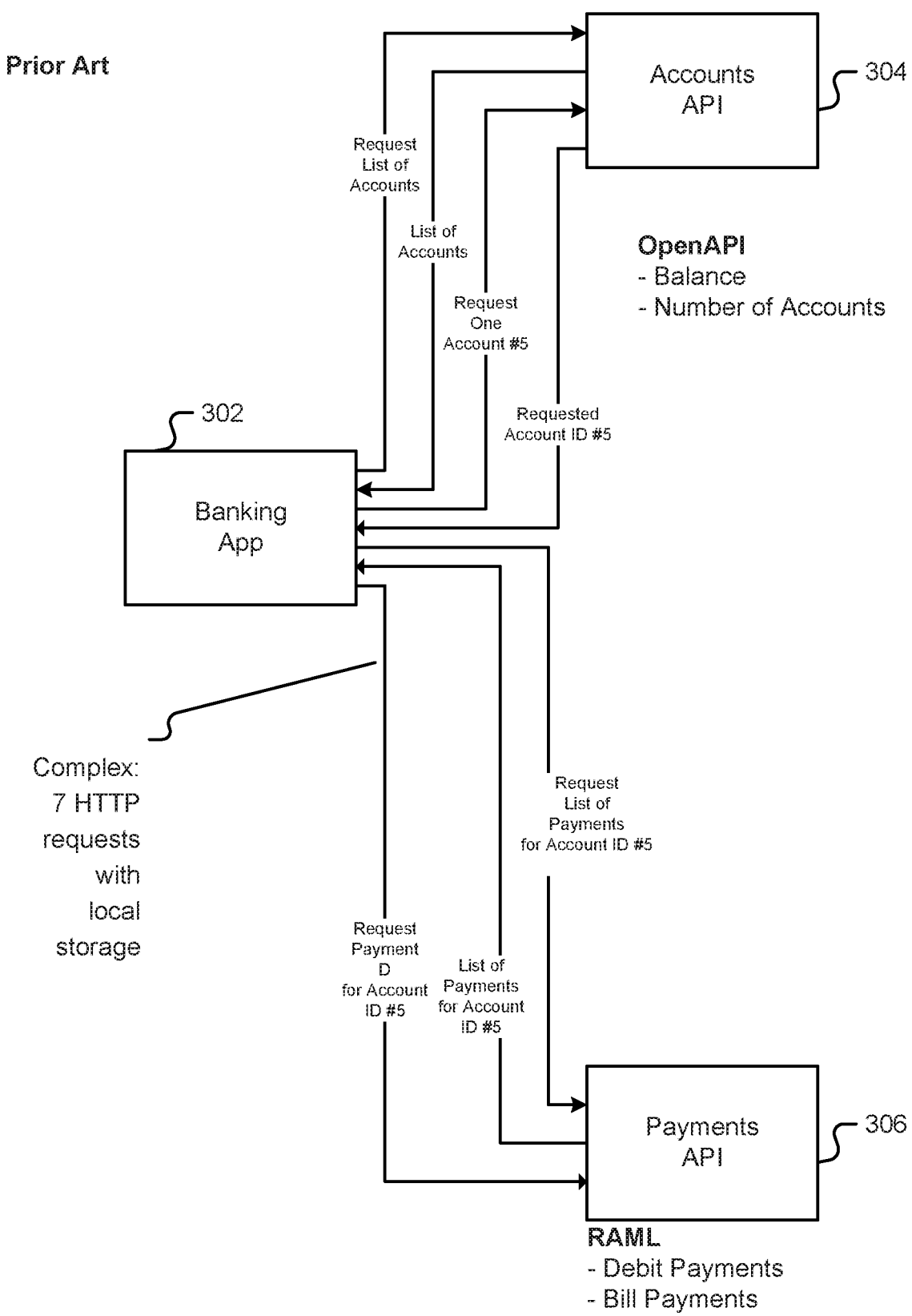
FIG. 3A is a block diagram illustrating a traditional banking application.

FIG. 3A is a block diagram illustrating a traditional banking application. A banking app (302) requires access to two data services: one associated with account information via an accounts API (304), and one associated with payments information via a payments API (306). In the example shown in FIG. 3A, the account API (304) is OpenAPI that services requests of balance and the number of accounts for a customers, and the payments API (306) is RAML that services requests of debit payments and bill payments for an account.

As can be shown in FIG. 3A, without a federated technique the developer of banking app (302) directly interfaces with the two APIs (304, 306) with its inherent complexity, facing seven HTTP requests with local storage of request results, including for Accounts API (304): requesting a list of accounts, receiving a list of accounts, requesting a specific account #5, and receiving the requested account #5 ID, and including for Payments API (306); requesting a list of payments for account #5 ID, receiving a list of payments, and requesting a payment D for account #5 ID.

Figure 3B:
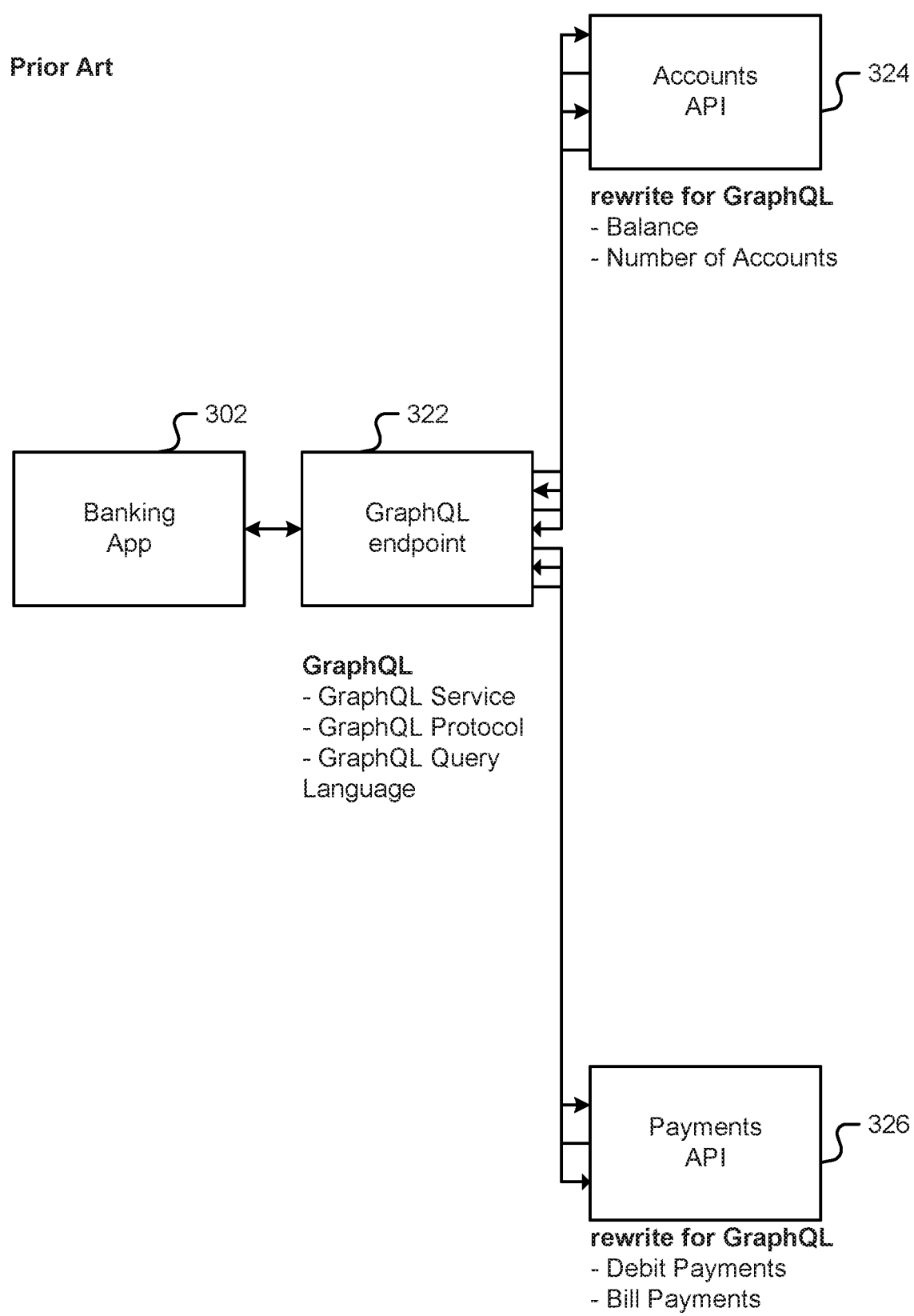
FIG. 3B is a block diagram illustrating a banking application using a traditional monolithic interface.

FIG. 3B is a block diagram illustrating a banking application using a traditional monolithic interface. In one embodiment, this is analogous to the graph approach (282) shown in FIG. 2J. A federated graph endpoint (322) such as that used with GraphQL and/or W3C Hydra with TPF (and shown in this example as a GraphQL endpoint), is a monolithic approach with a single GraphQL service, GraphQL protocol, and GraphQL query language. While the approach now is federated requiring simpler requests from the banking app (302), this requires a rewrite for the accounts API (324) from OpenAPI to GraphQL and a rewrite for the payments API (326) from RAML to GraphQL. This may require more development time and/or resources, may be error prone, and may not leverage all the services available from the accounts/payments source, for example rate throttling policies and/or authentication.

Figure 3C:
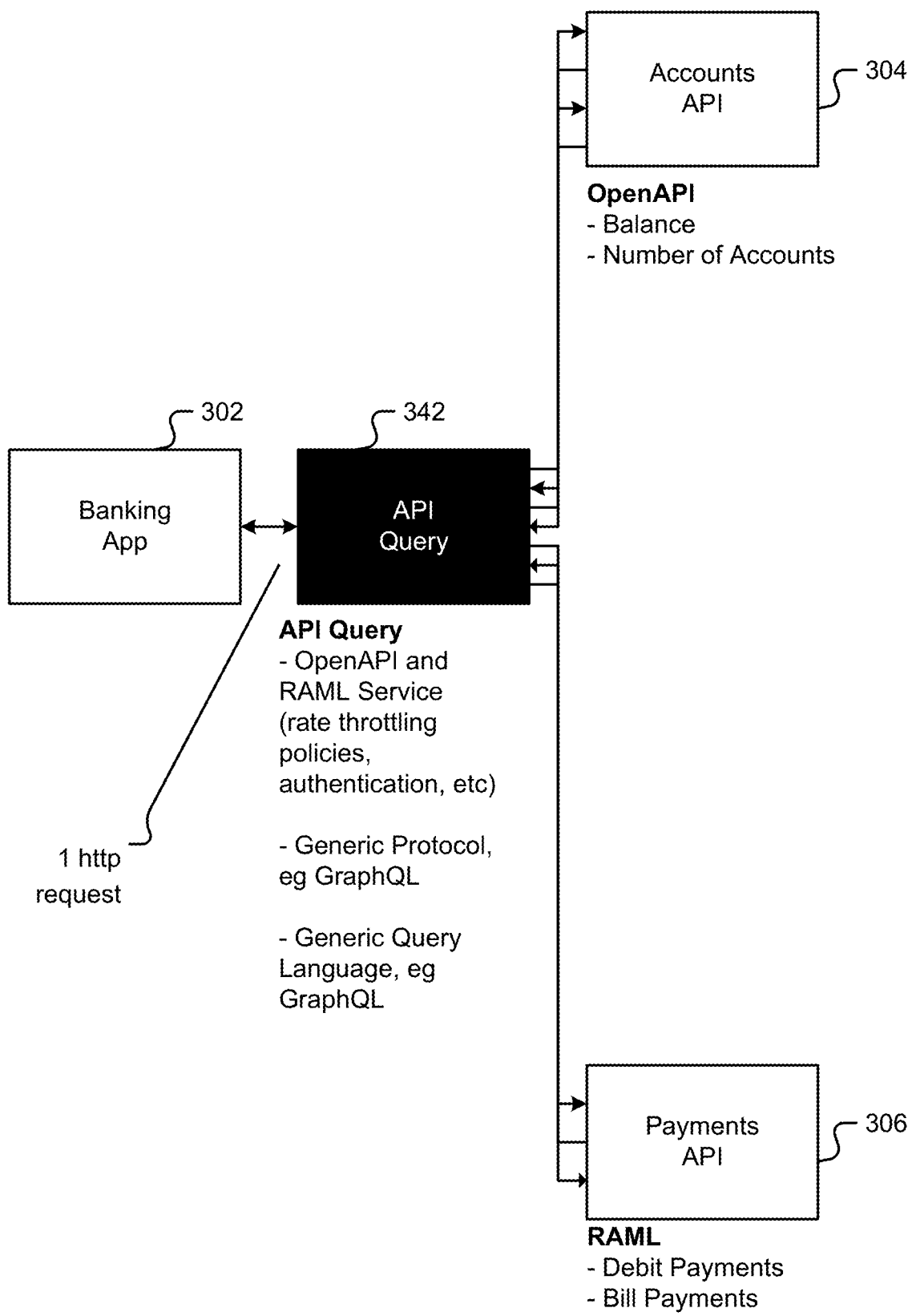
FIG. 3C is a block diagram illustrating a banking application using an API query engine.

FIG. 3C is a block diagram illustrating a banking application using an API query engine. In one embodiment, this is analogous to the API query engine approach (292) shown in FIG. 2J. An API query endpoint (342) is a federated approach with an API query service that leverages the already existing OpenAPI API for the Accounts API (304) and already existing RAML API for the Payments API (306), leveraging the services of these APIs such as rate throttling policies, authentication, and so forth. The API query endpoint (342) is flexible to support a generic protocol such as GraphQL and a generic query language such as GraphQL, SPARQL, and/or another declarative graph query language. The approach maintains a simple federated convention requiring a single http request from the banking app (302), while maintaining the improvement of less development time and/or resources, and leveraging all the services available from the accounts/payments source by reusing the respective APIs of the Accounts API (304) and/or Payments API (306).

The system of FIG. 3C may be executed in a client, for example a workstation, desktop computer, laptop computer, and/or phone. In one embodiment, both banking app (302) and the API query system (342) are in a client such as a phone so that API query (342) interfaces directly to the servers via accounts API (304) and payments API (306). In one embodiment, the banking app (302) is in a client such as a phone, and the API query system (342) is hosted in the network, for example in a cloud server. The API query system (342) then interfaces to the servers via the respective APIs (304, 306) from the network.

Figure 4A:
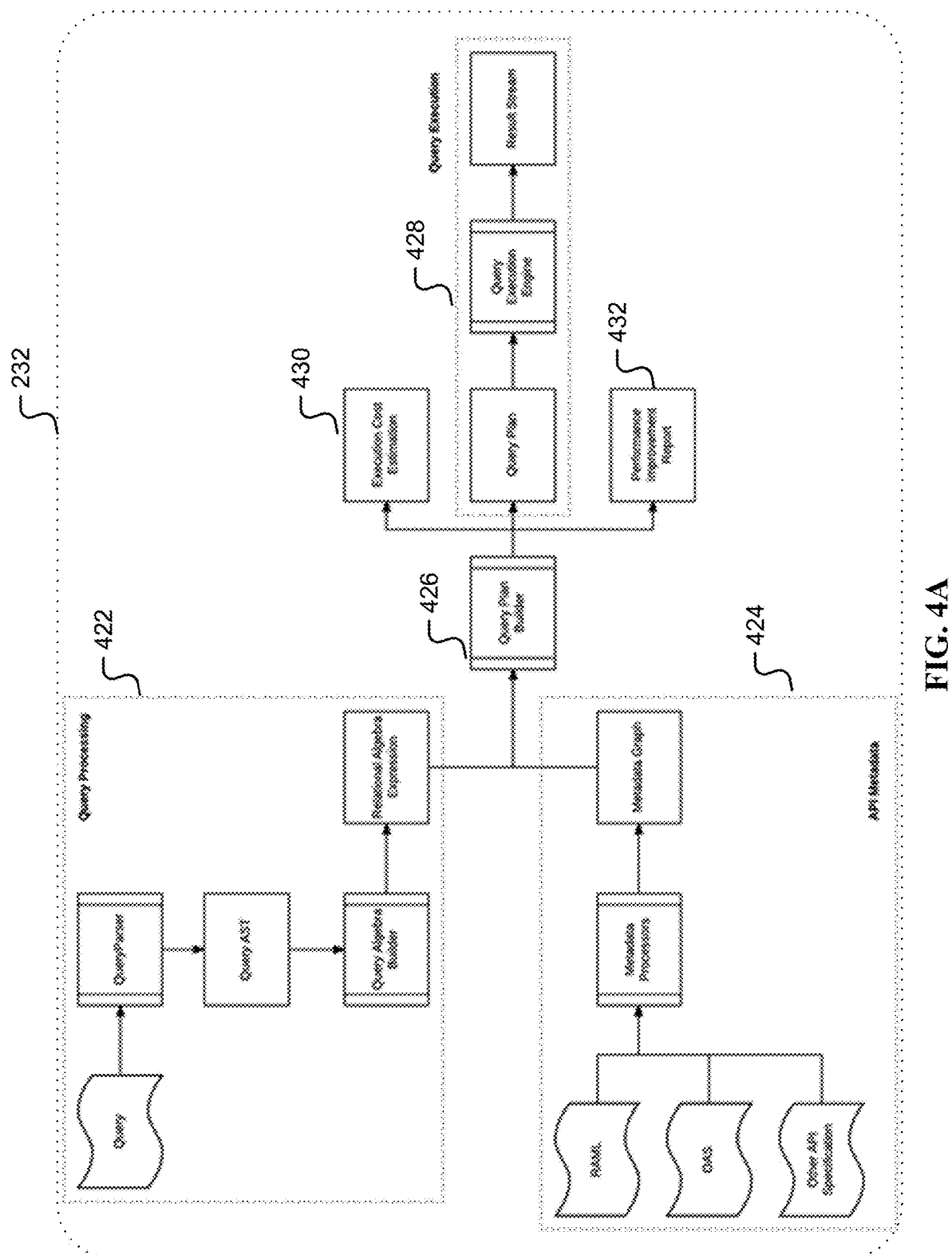
FIG. 4A is a block diagram illustrating an embodiment of a system for an API query engine.

FIG. 4A is a block diagram illustrating an embodiment of a system for an API query engine. In one embodiment, the system of FIG. 4A is part of the API query engine (232) of FIG. 2D. The generic design of an API query engine (232) comprises the following components:

A query processing system (422) for processing a query, which may include a query parser, a query AST (abstract syntax tree), query algebra builder, and/or relational algebra expression handling;
An API metadata system (424) for processing RAML, OAS, and other API specifications. This may include one or more metadata processors and/or a metadata graph;
A query plan builder (426);
A query execution system (428) for executing a query, which may include query plan handling, a query execution engine, and/or result stream handling.
There may also be systems for execution cost estimation (430) and/or performance improvement reports (432).

Without limitation, example API protocols/specifications include RAML, OAS, GraphQL, Web Services Description Language (WSDL), Google RPC Remote Procedure Calls (gRPC), and so on. Without limitation, example query languages include graph oriented languages such as SPARQL or Cypher and/or document oriented languages such as a REST query or GraphQL.

In one embodiment, an API query engine includes an ability to produce an execution cost estimation (430) that may be used by users of the query mechanism to understand the operational implications of executing specific queries. Traditional algorithmic complexity analysis may not be the best way of providing this information to users, since asymptotic complexity may not be easily understandable by users and the asymptotic value does not take into account hidden cost factors for a full class of queries that may have important operational consequences for different queries within the same complexity class.

In one embodiment, to avoid these problems, a parametric model is used as the basic cost unit for the API query mechanism: the HTTP request, as the barometer operation, used to compute the final cost estimation for the query plan, according to some cost configuration parameters for each operation in the query plan that the user may configure.

The following cost function is disclosed:
cost(operation: QueryPlanOperation, conf: Configuration): Int
which renders a consistent numeric cost value for the full execution of the query that may be used, for instance, to compare different queries or to impose constraints over the kind of queries allowed to be executed. Note that regardless of the full execution cost, the query may still be executed and partial results obtained without incurring in the full execution cost, due to the streaming computational model proposed for the query plan execution.

In this approach, different hidden costs, like the average number of pages for a collection node in the data model or the average size of a resource node may be configured per node or a default value may be used. This allows users to refine the cost estimation mechanism to their necessities.

The API query mechanism may be dependent on the correct specification of the API in an API spec document, for example RAML or OpenAPI specification as well as the exposed capabilities in these APIs in a standard way such as pagination and/or filtering.

In one embodiment, an API performance improvement automatic suggestions feature (232) is provided as a mechanism to give feedback to the users of the API query mechanism about the relationship between the level of detail provided in the API specs and the final execution cost calculated for a query. This provides information to users about the features that are missing in the spec to improve the performance of the query, whether by annotating an existing feature in the query in a standard way or by introducing the feature as new capability of the exposed API. Collecting these suggestions is a task that may be achieved as a side-product of the construction of the data model and query plan from the query algebra expression composed out of the query text.

Figure 4B:
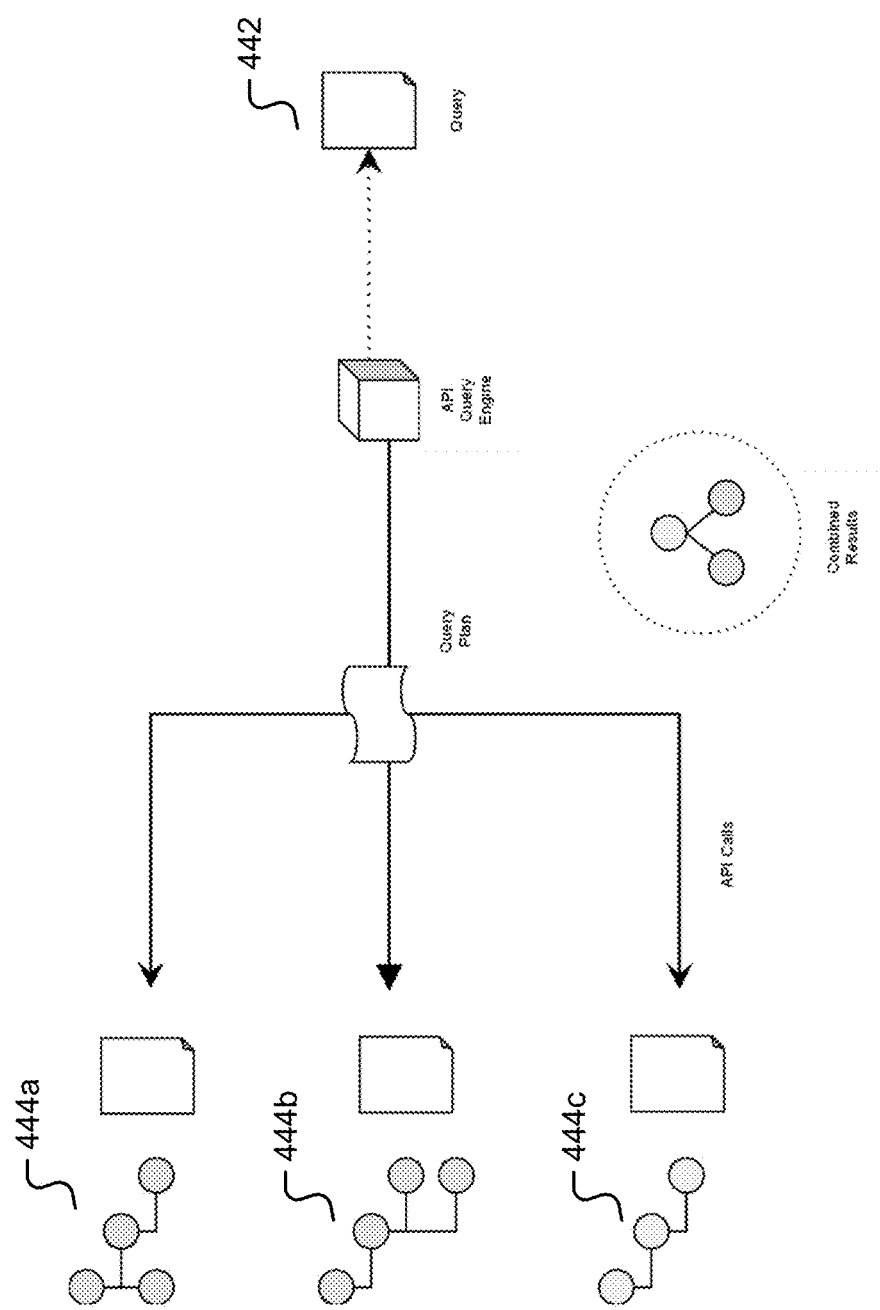
FIG. 4B is an illustration of a query plan execution mechanism for an API query engine.

FIG. 4B is an illustration of a query plan execution mechanism for an API query engine. In one embodiment, the mechanism of FIG. 4B is included in the query execution system (428) of FIG. 4A. As shown in FIG. 4B, a query plan execution mechanism for an API Query engine includes executing a query plan computed for a provided declarative query (442) using description meta-data available in different data sources (444a, 444b, 444c).

Figure 4C:
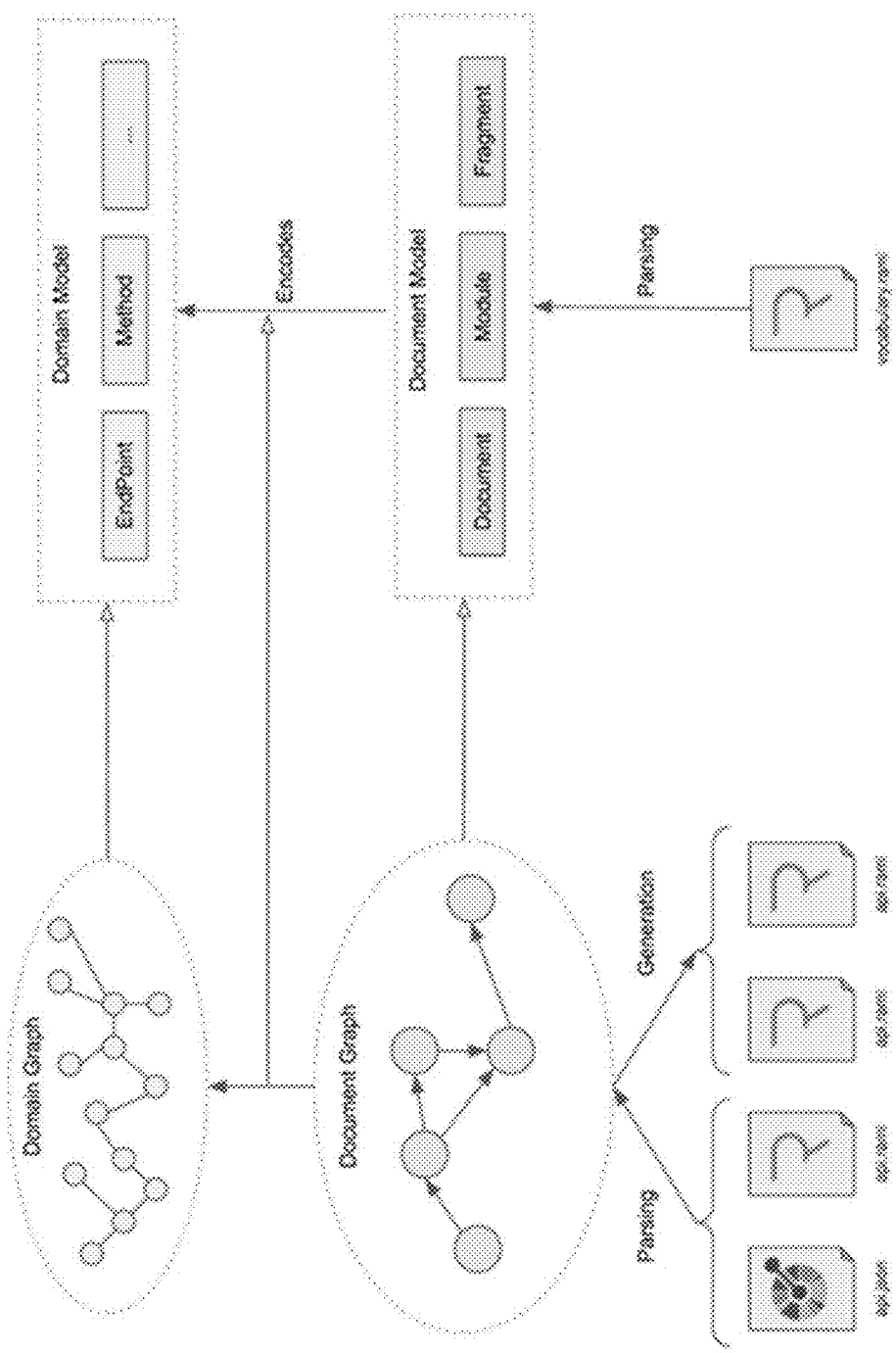
FIG. 4C is an illustration of an AMF for an API query engine.

FIG. 4C is an illustration of an AMF (API modeling framework) for an API query engine. In one embodiment, the framework of FIG. 4C is included in the API metadata system (424) of FIG. 4A. As shown in FIG. 4C, an AMF common abstract model may be used for multiple API specs, thus mapping different specifications to a common metamodel. Automatic API query enablement may use heuristics, with or without user feedback. In one embodiment, ML is used for this.

Heuristics. The set of heuristics and strategies used to optimize the data graph generated from the set of web API specs used to discover the remote data that can be accessed by the API Query engine is disclosed. The main challenge in the construction of the data-graph is that web API specification languages, like RAML and OpenAPI, do not provide a way of specifying the relationships between the resources described in the specification. They typically limit themselves to collect a flat list of endpoints with input/output parameters and request and response bodies.

API designers following a REST architectural approach may encode the graph of HTTP resources in this list of endpoints. Details of this mapping are not explicit in the final web API specification. As part of the construction of the API query data graph, the mapping details may be inferred to produce as accurate as possible a reconstruction of the original graph of HTTP resources. A list of heuristics may be used by the AP query implementation to build the approximate data-graph that may be used to satisfy user queries over the provided set of web APIs.

End-Point Selection.

This mechanism is used to filter the list of end-points from the different APIs that may be used to produce the data-graph. One requirement is that the API Query engine cannot invoke unsafe code, understanding by unsafe, code in the underlying APIs that can mutate or destroy information. In order to achieve this goal, the list of end-points described in any API spec being queried is filtered to only use safe methods in the construction of the data-graph.

An end-point is considered safe if the following conditions are met:
  Supports an idempotent GET operations;
  The GET operation has a response with a 2XX successful status code described; and
  The payload for the successful response is described in the specification.
Only these endpoints may be taken as input of the data-graph generation logic.

End-Points Folding.

In order to reconstruct a tree of HTTP resources from a list of filtered end-points, a folding mechanism may be implemented that relies on the hierarchical structure of URL paths to build the tree. The folding algorithm works in the following way. Provided with a list of endpoints with associated paths:
  1. Remove variables from resource paths;
  2. Sort lexicographically by path and path length;
  3. Partition endpoints by first component of the path;
  4. Remove the parent path from the paths in the partition; and/or
  5. Create a map of nested endpoints invoking the algorithm recursively.
The output data structure with nested maps contains the tree of reconstructed resources for the data graph.

For example provided the following list of paths (after removing variables):

```
[
'/a',
'/a/b',
'/a/b/c',
'/a/d',
'/e',
'/e/f',
'/g/h/i'
]
```

The first iteration of the algorithm may produce the following output map including the recursive invocation to fold:

```
{
  '/a': fold(['/b','/b/c','/d']),
  '/e': fold(['/f']),
  '/g': fold(['/h/i'])
}
```

And the final tree of resources may be:

```
{
  '/a': {
    '/b': {
      '/c': {},
    },
    '/d': {}
  },
  '/e': {
    '/f': {}
  },
  '/g': {
    '/h/i': {}
  }
}
```

Function Field Arguments Generation.

In order to generate a valid GraphQL schema, connections between nodes in the data-graph may be transformed into GraphQL function fields with arguments. This may require the generation of a default name for the field and a set of arguments for the field. The following procedure may be followed to generate a default name and mapping for the GraphQL field based on the underlying spec information:
  1. Last segment in the path that is not a variable is used as the name for the field;
  2. If the payload of the operation is an array, the field name is pluralized;
  3. The name of each variable after the last non variable path component is connected by the '_and_' string;
  4. If there are variables in the path, the resulting string from 3) is connected to the output of 2) by the '_by_' string;
  5. Variables in the path are added as non-nullable arguments to the field of type string; and/or
  6. Query parameters are added to the arguments of the field using the associated constraints to decide if they can be nullable.

For example for the endpoint with spec information:
Path: /a/{f}/g/{h}/{i}
Query parameters: with j: mandatory string, k: optional string
Output payload of type array of type G
The following field may be generated:
gs_by_h_and_i(f: string, h: string, i: string, j: string, k: string!)

Common Path Arguments Removal.

In order to minimize the number of parameters in a function field, if the graph connection to a parent node shares path variables with the graph connections in the children resources, the shared variables may be removed from the children generated function fields. These variables may be inserted automatically by the engine when the query result is computed at runtime.

For example, provided these two nested end-points:
Parent—Path: /a/{f}
Child—Path: /a/{f}/g/{h}
The following functions may be computed
Parent—a_by_f (f: string)
Child—Parent::g_by_h (h: string)

In the child field function, the argument f may be omitted since the runtime value may be extracted from the request to the parent.

Payload Arguments Removal.

When computing the final list of arguments for the GraphQL field associated to a data-graph connection, the name of the properties of the parent node payload may be used to remove field arguments matching the name of properties in the payload. This information may be inserted by the engine at runtime based on the value of the parent resource.

For example provided these two nested end-points:
Parent
    Path: /a/{f}
    Payload: A(h: string, i: number)
Child:
    Path: /a/{f}/g/{h}
    Payload: G The following functions may be computed, without applying other heuristics:
Parent:
    a_by_f (f: string): A
Child:
    A::g_by_f(f: string): G The value of the h argument in the child connection may be computed using the value of the payload obtained in the parent. If the payload of the parent is an array, the properties of the item type in the array may also be used to remove parameters from child connections.

Type Names and Attribute Field Names.

As part of the generation of a GraphQL schema, names for the types and fields in the schema may be generated. In order to accomplish this, the name of the schema in the payload of the mapped HTTP operation and the names of the properties for that schema may be used.

In certain situations no name might be available for the schema type, for example, when the schema is directly declared inline in the response payloads. In this case, the name of the schema type may be generated directly from the last component of the endpoint path that is not a variable using a combination of capitalization and singularization for non array types or pluralization for array types.

Top level function fields for path arguments.

GraphQL allows users to join resources connected in the datagraph by nesting selected fields in the query. When generating the API query data graph however, any resource accessible through a HTTP URL or whose URL can be reconstructed using the information available in the underlying API specification, RAML or OpenAPI, may be accessed directly. In order to preserve this ability, for each connection in the data graph that is being exposed as a nested type in the GraphQL schema, an additional top level function field may be added that may be used to retrieve the nested resource automatically provided users of the query engine know all the required parameters.

For example, given the following endpoints:
Parent
    Path: /a/{f}
    Payload: A(h: string, i: number)
Child:
    Path: /a/{f}/g/{h}
    Payload: G The following schema may be generated:

```
Type Query {
    a_by_f(f:string): A
    g_by_f_and_h(g: string, h: string): G
}
Type A {
    h: string
    i: number
    g_by_h(h: string): G
}
Type G
```

Where A::g_by_h (h: string) allows the access to nested G instances on A and the equivalent additional top level function field Query::g_by_f_h (g: string, h: string) is added to allow direct access to G from the top level.

Top Level Function Fields for Resource URLs.

Another important use case is allowing direct access to any resource in the schema directly by the URL identifying the resource. Unlike the mechanism described above, in this case a new set of top level function fields are generated that accept as a single argument the URL of a resource, instead of the parameters found in the underlying API specification, RAML or OpenAPI.

To declare the name of the field, the name of the type plus the 'by_ID' string may be used. The special GraphQL ID scalar type may be used to mark the parameter of the top level field function as an URL. Additionally, a simple URL path may also be accepted as a valid argument. Execution of this methods may trigger a simple HTTP GET request to the underlying API.

For example, given the following endpoints:
Parent
    Path: /a/{f}
    Payload: A(h: string, i: number)
Child:
    Path: /a/{f}/g/{h}
    Payload: G(j: string, k: string)

The following functions may be added to the top level Query type of the GraphQL schema:
    a_by_ID (url: ID)
    g_by_ID (url: ID)

These function fields may be used by users of the API query mechanism to find instances of A and G directly using the URL of the underlying resources.

For example, the following queries may be valid:

```
a_by_ID("/path/to/a/234351") {
    h
    i
}
g_by_ID("http://myapi.com/path/to/g/34341009") {
    j
    k
}
```

Controlling the Heuristics.

As mentioned above, one role of heuristics is to generate as optimal as possible a default mapping for the data graph parsed from a set of web APIs in an automatic and/or semi-automatic fashion. It may be important to allow users of the API query functionality to be able to control and override the default behavior of these heuristics to customize the final data graph, and associated GraphQL schema, that is going to be queried.

In one embodiment, the mechanism used is a set of declarative annotations that may be used to provide hints to the data graph parsing algorithm, changing the behavior of the data-graph generating heuristics. Every web API specification language supported by the API query engine including RAML and/or OpenAPI provides a mechanism for writers of specifications to extend the semantics of the language with their own information, for example RAML annotations or OpenAPI extensions. These native extension mechanisms may be used by the API query system to provide the data-graph generation hints.

If the specification language used as the source for the data-graph generation does not support extensions, syntactical comments may be used to provide the annotations within the comment sections of that spec. The following table summarizes some supported annotations used to override the heuristics for the generation of the data graph.

| Annotation (RAML syntax) | Description |
| --- | --- |
| (query-relation-name) | Name to be used for the edge connecting two resources in the data graph |
| (query-relation-target) | Resource to be used as the target of the edge in the datagraph |
| (query-resource-type-name) | Name for a node in the data graph |
| (query-parameter-name) | Name for a parameter in the edge connecting two resources in the data graph |
| (query-hide-top-level-operation) | Prevents the generation of a top level operation for a resource |

Figure 5:
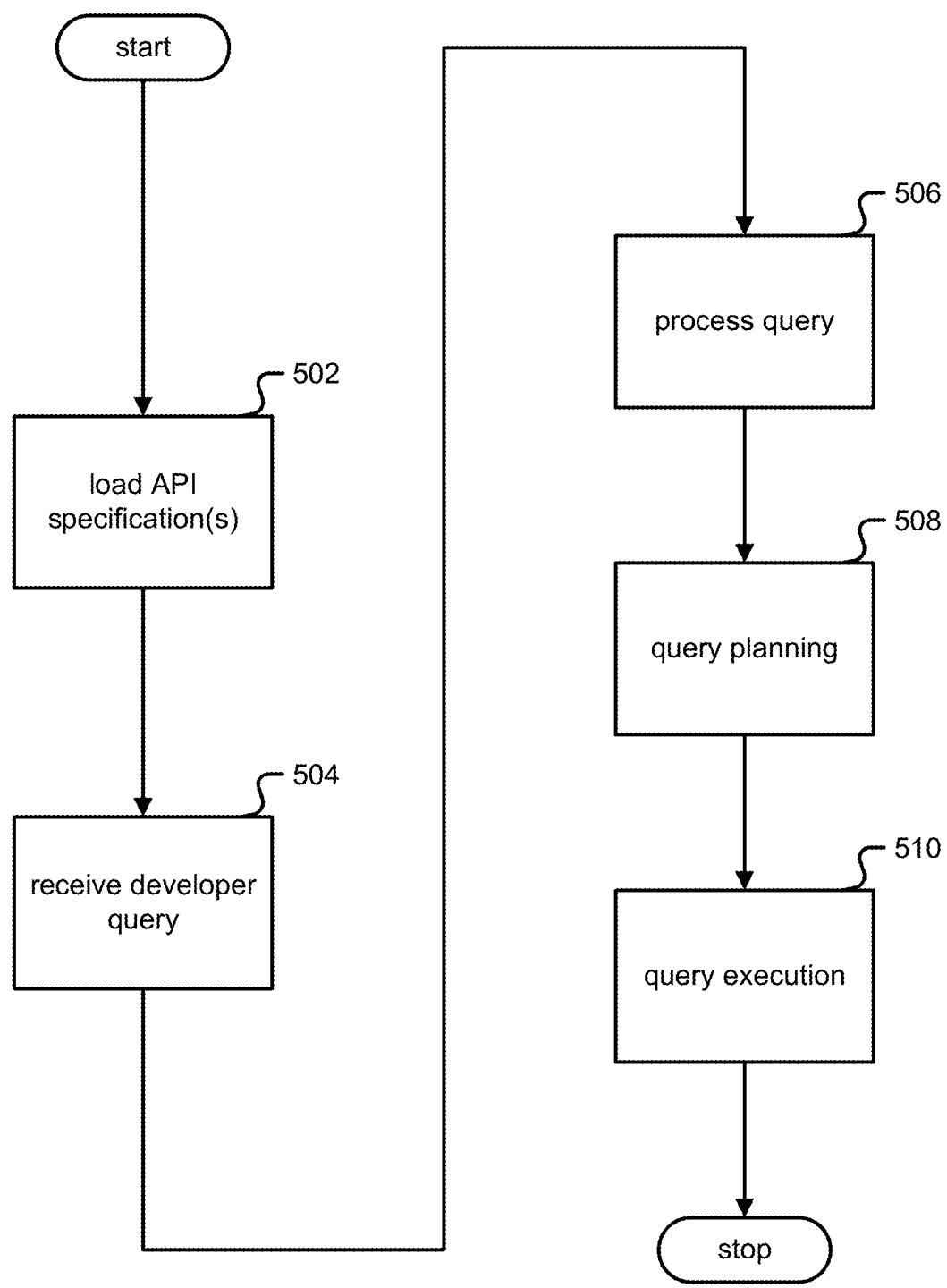
FIG. 5 is a flow chart illustrating an embodiment of a process for processing a declarative query in an API query engine.

FIG. 5 is a flow chart illustrating an embodiment of a process for processing a declarative query in an API query engine. In one embodiment, the corresponding illustration for this workflow is illustrated in FIG. 4B, including important steps in processing a declarative query (442) in the API Query mechanism.

In step 502, an API query engine (232) loads one or more API specification(s). In one embodiment, the engine (232) may access metadata that a specification exposes. The type of metadata varies from data source to data source. This metadata may be used to build a conceptual unified data graph connecting types of entities in different data sources and the shape of the data for each entity.

In one embodiment, certain capabilities like linking entities across data sources may be natively supported in that type of data source, for instance hypermedia links in an HTTP API, but alternately these capabilities may not be natively supported. Extension mechanisms in the data-source spec language, for instance RAML annotations or OpenAPI extensions, may be used to provide this information in a way that may be understood by the API Query engine when building the unified data graph.

The specification may be used for the following purposes:
Query validation—For example, would a query use unknown identifiers, for example property names that do not exist on a known API spec data model? May the query be solved against the specified APIs, for example solving the query may require a certain API to provide a data access method which is not present?
Query planning and optimization—What is an efficient way to execute the query? What is an efficient sequence of API calls? What work may be "pushed down" to the underlying systems, for example with filtering?
Query execution—What are the access mechanisms for each API, for example with transport and/or authentication?
Query editing—Providing autocompletion and contextual support for query editing.

In step 504, a query is received that a developer has written. Typically, a developer writes a query described in a supported query language. As the engine (232) is designed in a modular way, a query editor (242, 252) may have access to an API metadata graph (424) and/or a query AST (422), through which it may provide context aware autocompletion and syntax highlighting.

In one embodiment, in a data query mechanism, queries may be executed over a physical arrangement of data, for example, tables in a relational database management system. In one embodiment, in the API query mechanism the data model is the graph of REST resources exposed using the HTTP protocol. Other example protocols including SPARQL, Cypher, GraphQL, REST Query, and/or various other query languages may be similarly implemented using the disclosed techniques without limitation.

In one embodiment, an API data model builder component creates this data model using information extracted from API protocols/specifications, for example, in the RAML or OAS protocols/specifications. Other example API protocols/specifications include GraphQL, WSDL, gRPC and/or various other specifications and may be similarly implemented using the disclosed techniques without limitation.

In step 506, a query engine (232) processes the query, including syntax parsing and/or query algebra. In one embodiment, a query engine (232) accepts the text of a new query in any of the query languages supported by the query engine:
A lexical and syntactical processor plus a grammar description of the query language may be used to produce a high level AST providing a symbolic representation of the text of the query that may be algorithmically manipulated;
The AST may then be processed to produce a query algebra expression, describing in a formal way the logic of the query that may be executed; and/or
The query algebra expression may be simplified as much as possible to produce a canonical query algebra expression ready to be processed using the information in the API Query data graph.

In one embodiment, different declarative queries may produce compatible query algebra expressions, isolating the query engine mechanism from the particularities of each query language. Different query languages may also introduce different computational complexity and have different expressivity. Simple query languages like GraphQL may produce simplified query algebra expressions than more expressive languages like SPARQL or SQL.

In one embodiment, users of the query mechanism interface with the system through a declarative query language where an expected result, not the particular steps required to achieve that result, are specified. This part of a query mechanism takes care of processing a query, expressed in graph query language for REST, and transform the text of that query in a mathematical formalism, a relational algebra for data graphs, that may be formally processed: simplified, estimated and finally evaluated.

In one embodiment, the query language is based on the description of data templates over the shape of the REST resources connected in the API data model. In one embodiment, and without limitation syntactically it may be a variant of JSON-LD (see http://www.w3.org/TR/json-ld/, which is incorporated herein by reference for all purposes) wherein variables have been added in order for the JSON document to become a template for the final JSON documents that are produced as output. Some additional syntactical improvements may be added to make the queries less verbose and easier to type, such as making double quotes for literals optional. Other query languages may be similarly implemented, such as SPARQL, JSON-LD, and/or various other query languages such as described above and may be similarly implemented using the disclosed techniques without limitation.

In one embodiment, the query language makes an explicit mapping from JSON-LD keywords, like resources (@id) and lists (@list) to the underlying data model entities; REST resources and resource collections, and adds a new keyword to make the metadata of the schema queryable (@meta).

In one embodiment, part of the query mechanism dealing with the processing of the declarative queries and the generation of a machine processable representation of the formalism is used as one of the inputs to compute the query plan for the query. In one embodiment, a proposed query language referred to herein as "REST QL" is largely based on JSON-LD syntax, extended with the introduction of the variables, metadata directives and some syntactic sugar.

REST QL introduces some ideas from GraphQL, making the API resources the main target of the query instead of targeting just the data being exposed. REST QL is:
  easy to write and read using a clean JSON syntax;
  resource oriented, hiding the API layer, for example with respects to filtering and/or pagination;
  an equilibrium between expressivity and feasibility of queries over APIs;
  featuring collections as first class resources and part of the query language;
  supporting reflection as built-in; and/or
  extendable to support RPC APIs.

REST QL is based on JSON grammar (see http://www.json.org, which is incorporated herein by reference for all purposes) with the following extensions in the pair member keys of JSON objects:

```
pair: pair-key \s* : \s* value
pair-key: (directive | identifier | namespaced-identifier) "?" | string | variable
directive: @context | @id | @type | @list | @meta | @filter | @offset | @limit
Identifier: [a-z]+[a-zA-Z0-9\-_]*
namespaced-identifier: identifier '.' identifier
```

Additionally, REST QL introduces a new value, the variable.

```
value: string | number | object | array | variable | "true" | "false" | "null"
variable: \?[a-z]+[a-zA-Z_0-9]*
```

The following objects are valid REST QL documents:

```
{
  identifier: "value"
}
{
  namespaced.identifier: "value"
}
{
  @id: "value"
}
{
  "withQuotes": ?variable ,
    withoutQuotes: ?otherVariable,
    optionalProperty?: ?variableValue
}
```

With respects to namespaces, prefixes may be described in the query language client as a mapping from prefixes to URI prefixes or inline in the text of the query using the @context directive. Properties without namespaces may be considered to be in the default namespace. Namespaced identifiers not declared in the context may be considered to be invalid.

Variables may be used to extract information from a set of APIs. They may appear as the key or the value in a query map. When in the key position, they may be bound in a result to:
  @id directive
  @type directive
  Scalar properties
  Object properties
  Link properties
When in the value position, they may be bound to:
  Resource URI
  Type URI
  Scalar value
  Data node value
  Linked resource link If a variable is bound to the value of a nested resource, the binding in the solution may be a resource link, a map containing only the nested resource URI. This may avoid unnecessary lookups and may be bound to solutions of the type. If the full nested resource is to be retrieved, a nested query node may be added.

In one embodiment, this approach avoids recursive expressions in the fetching of resources. @meta, @limit, @offset and @filter directives are not necessarily bound to variables. Meta information may be requested explicitly. Collection filtering and pagination may be queried explicitly to request a particular collection page, but it may not be returned in a variable property. They may only be returned when used explicitly in the query.

In one embodiment, queries contain collection nodes explicitly, if the user wants to retrieve the URI of the collection resource, or set explicitly pagination values or collection specific filters. Collection queries may also omit the collection node when the URI of the collection is not required, or the filter property matches a property in the collection members. Pagination may automatically be used by the engine to stream results to the client if not a single page of the collection is requested in the query.

In one embodiment, meta-data about the data model may be queried using the @meta directive. Filters executed over the query not supported by the server side APIs but that are to be computed by the query engine may be expressed using a filter language including basic filter expressions. Filter expressions may appear in any node of the query and may be able to use any nested variable form the expression location. Client and server filters may be used together in filter expressions. When expressing a query, a property may be made optional by appending a '?' to the name of the property identifier, variable or property string. In one embodiment, a minimalistic query algebra is used to characterize API Queries in a formal way.

In step 508, a query engine (232) provides query planning handling. In one embodiment, using the API Metadata the engine (232) proceeds to construct a query plan (428). The query plan may dictate the API calls that are made in order to resolve the query. This is similar to traditional query planning in SQL and/or other database technologies, but may have a few differences:
  Not all queries are solvable. For example, a specific data access mechanism is required but the underlying APIs does not provide it. This is rarely the case in traditional SQL, wherein as long as the query does not mention any tables or fields that do not exist, the engine may solve the query. The API query engine (232) may be capable of understanding what part of the query is not solvable and it may be configured to inform the user. It may also suggest a specific improvement that is needed on the API.

Some queries are prohibitively inefficient. In traditional SQL, query performance is related to query complexity, available memory, and the way data is stored. In general, nearly all queries may be solved given enough time. By contrast, in an API query there are new factors taken into account: network latency, API limits, throttling, and/or access mechanisms for a particular segment of the data. Not all queries may be solved given enough time, since an API may need to be called multiple times, exceeding a call limit imposed by the API provider and/or an API may need to be called multiple times over a high latency network. These situations may be common. The engine therefore may be configured to identify such a situation and report back to the user. In some cases, a solution may be suggested.

In one embodiment, a query plan builder component combines the information from an API data model graph with a query algebra expression obtained from the text of a declarative query to produce a machine-processable query plan comprising a set of instructions about how to fetch data, process data, and/or combine it to produce a set of result mappings for the requested query.

A relational algebra expression may be evaluated in different ways. In one embodiment, a query plan builder generates a particular set of query operators that are used to evaluate the query in a particular order that minimizes the execution cost. Information from the data model is used by the query planner to decide, for example, if one particular part of the algebra expression is evaluated using a local data join or a join across resources using a HTTP request. The more information available in the API specifications and the more powerful those APIs are in for example, implementing server side features like collection filtering, the more efficient the query execution becomes.

Each query plan may have an associated performance cost, expressed as the asymptotic time and space complexity of the query and an associated query score that may be easily interpreted by users of the query mechanism. In one embodiment, the query planner suggests a number of improvements of the underlying APIs that may lead to an API data model that may produce a more efficient query plan for the same declarative query.

In one embodiment, a query plan builder accepts an algebraic expression constructed by a query processing module and a data model built from the API specs being queried by a data model builder processor and constructs a query plan for the query replacing query algebra expressions by query plan operations involving the transformation of resource payloads data structures and network operations.

In one embodiment, transformation rules are defined to produce a query plan expressed as an abstract notation from the query algebra expression using the information available in the data model. Query algebra expressions are processed applying a set of transformation rules until no further transformation may be applied, in some cases using a recursive technique. Some transformation rules may generate a set of solution mappings, and they may be applied to the full expression before a recursive invocation.

In step 510, a query engine (232) provides query execution handling. The engine (232) may proceed to execute the query plan, issuing requests to the various APIs using their native protocols.

In one embodiment, the query execution component takes an existing query plan and performs one or more HTTP requests and required data transformation to produce the final JSON-LD documents that satisfy the input query. In one embodiment, the query mechanism is based on a data streaming execution model. Partial results for the query may be immediately available for the client in an asynchronous way before the full result set has been computed, such that the full result set need not be stored in main memory and that the client may stop the execution of the query in any moment.

In one embodiment, to achieve this goal each node in the generated query plan is implemented as a specialized type of iterator that receives asynchronously upstream data from another iterator, performs a transformation, and streams data downstream. The composition of these iterators is itself an iterator where data flows through and where clients may subscribe to receive partial results as they are computed. When no more data is available in the source, iterators close, triggering the closing of the downstream iterators and finally notifying client code that all results have been computed for the query.

In one embodiment, results are returned to clients in two different ways: as sets of results mapping from variables in the query to results or as a JSON-LD document where the query template has been resolved using the result mapping.

In one embodiment, an execution model is based on the arrangement of a pipeline of iterators matching the structure of the query plan that may be used to stream partial results as the query solution is incrementally computed. An iterator may be defined for each query plan operation and connected to a tree of operators. Each iterator receives results from its parent operator upstream and emits results downstream. When all the results have been computed, all the terminal operators emit a closing signal that cascade through the tree of operators up to the root operator, finishing in this way the computation.

Figure 6A:
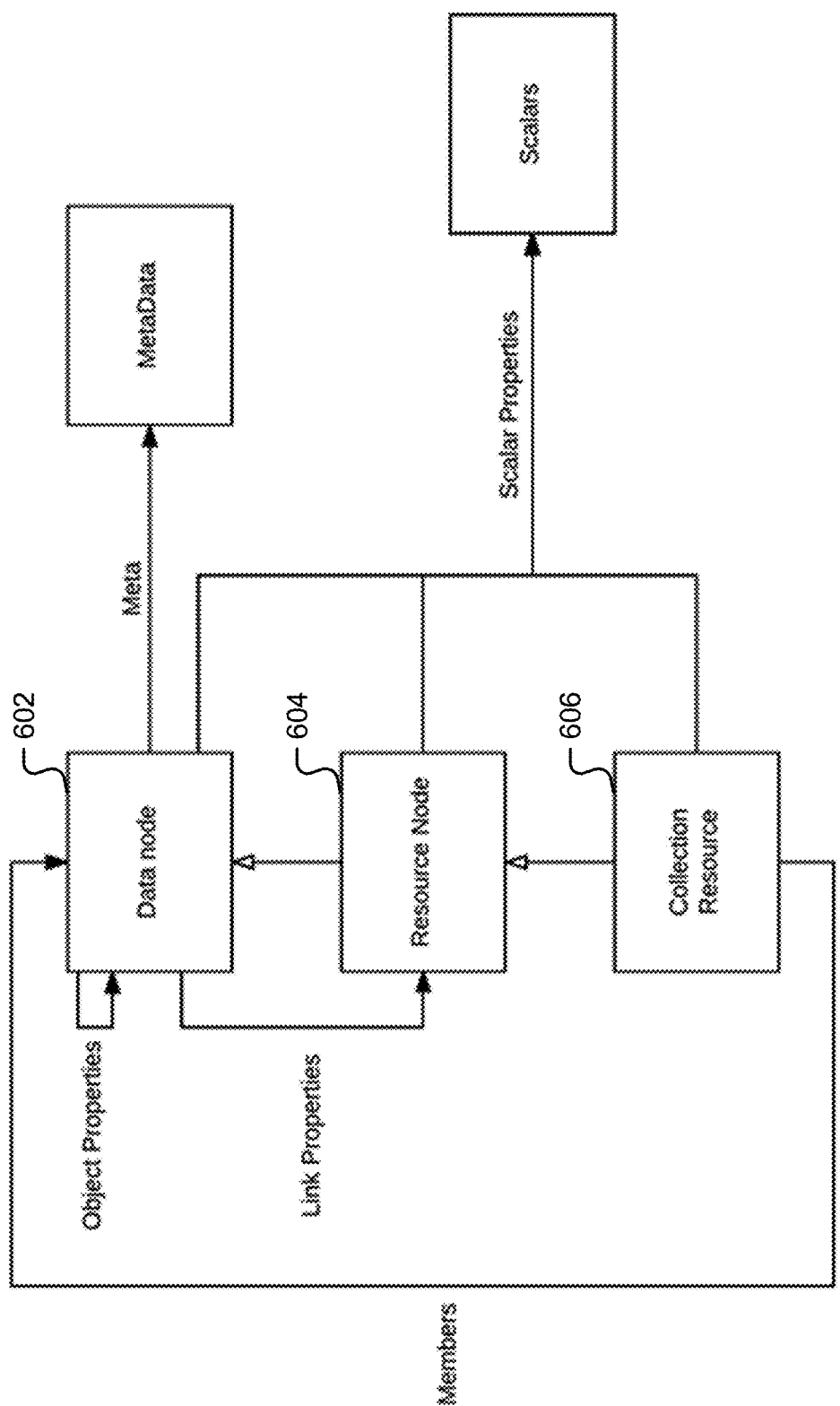
FIG. 6A is a block diagram illustrating an embodiment of an API data model.

FIG. 6A is a block diagram illustrating an embodiment of an API data model. This data model may be generated from the resolved output of an AMF parser using a data model construction technique. Without limitation, an example data model construction function is given below for an RAML and/or OpenAPI specification for clarity. In one embodiment, the function is used to generate a data model from a collection of raml-http: EndPoint instances computed in the resolved model produced by the AMF parser for a RAML or OpenAPI specification.

```
Procedure LINK(Type, l, Resources = [(Tr,lr)]) :=
    Let node = new Node(Type) // data nodes processed here
    If ! COLLECTION?(node)
    Let nested_resources = SORT({Resources / l ⊂ lr})
        Let reamining_resources = Rs − nested_resources
        While ! EMPTY?(nested_resources)
            Let (tr, lr) = FIRST(nested_resoures)
            Let (linked_resource, nested_resources) = LINK(tr, lr,
    REST(nested_resources))
            Node.links.ADD(linked_resource)
        RETURN (node, reamaining_nodes)
        Else
        Let member_link = { nested_resources /
        MEMBER_LINK_TEMPLATE(l, lr) AND Tr ⊂ T }
        If member_link = ø
```

```
            RETURN (node, nested_resources U
            reamining_resources)
        Else
            Let (tr, tl) = member_link
            Let (member_node, _) = LINK(tr, lr,
            REST(nested_resources))
            Node.member = member_node
            RETURN (node, reamining_resources)
```

The query engine (232) may build this data model from the information in the available APIs such as RAML and/or OAS APIs, before executing any queries. FIG. 6A shows the main entities in the data model and the connections among them.

Without limitation, the following type declarations describe elements in the data model including a DataIlode (602), ResourceNode (604), and CollectionNode (606):

```
DataNode := {
    @type: TYPE_IDENTIFIER | Object,
    scalarProperties: {
        SCALAR_PROPERTY_IDENTIFIER: SCALAR_TYPE,
    },
    objectProperties: {
        OBJECT_PROPERTY_IDENTIFIER: DataNode,
    },
    linkProperties {
        LINK_PROPERTY_IDENTIFIER: CollectionNode |
        ResourceNode,
    },
    @meta: {
        type: [TYPE_IDENTIFIER],
        scalar: [SCALAR_PROPERTY_IDENTIFIER],
        object: [OBJECT_PROPERTY_IDENTIFIER],
        link: [LINK PROPERTY_IDENTIFIER]
    }
}
ResourceNode :: DataNode := {
    @id: RESOURCE_IDENTIFIER
    override @meta: {
        type: [TYPE_IDENTIFIER],
        scalar: [SCALAR_PROPERTY_IDENTIFIER],
        object: [OBJECT_PROPERTY_IDENTIFIER],
        link: [LINK_PROPERTY_IDENTIFIER],
        key: [SCALAR_PROPERTY_IDENTIFIER]
    }
}
CollectionNode :: ResourceNode := {
    override @type: TYPE_IDENTIFIER | Collection,
    @list: MembersCollection,
    @filter: [SCALAR_PROPERTY_IDENTIFIER],
    @offset: SCALAR_PROPERTY_IDENTIFIER,
    @limit: SCALAR_PROPERTY_IDENTIFIER,
    override @meta: {
        type: [TYPE_IDENTIFIER],
        scalar: [SCALAR_PROPERTY_IDENTIFIER],
        object: [OBJECT_PROPERTY_IDENTIFIER],
        link: [LINK_PROPERTY_IDENTIFIER],
        key: [SCALAR_PROPERTY_IDENTIFIER],
        filter: [SCALAR_PROPERTY_IDENTIFIER],
        offset: SCALAR_PROPERTY_IDENTIFIER,
        limit: SCALAR_PROPERTY_IDENTIFIER,
        members: {
            type: [TYPE_IDENTIFIER],
            scalar: [SCALAR_PROPERTY_IDENTIFIER],
            object: [OBJECT_PROPERTY_IDENTIFIER],
            link: [LINK_PROPERTY_IDENTIFIER],
            key: [SCALAR_PROPERTY_IDENTIFIER]
        }
    }
}
MembersCollection := [ ResourceNode | DataNode ]
SCALAR_TYPE := number | string | boolean | null | undefined
RESOURCE_IDENTIFIER := URI
NAMESPACED_IDENTIFIER := IDENTIFIER '.' IDENTIFIER |
IDENTIFIER | URI
TYPE_IDENTIFIER := NAMESPACED_IDENTIFIER
SCALAR_PROPERTY_IDENTIFIER :=
NAMESPACED_IDENTIFIER
OBJECT_PROPERTY_IDENTIFIER := NAMESPACED_IDENTIFIER
LINK_PROPERTY_IDENTIFIER := NAMESPACED_IDENTIFIER
```

Figure 6B:
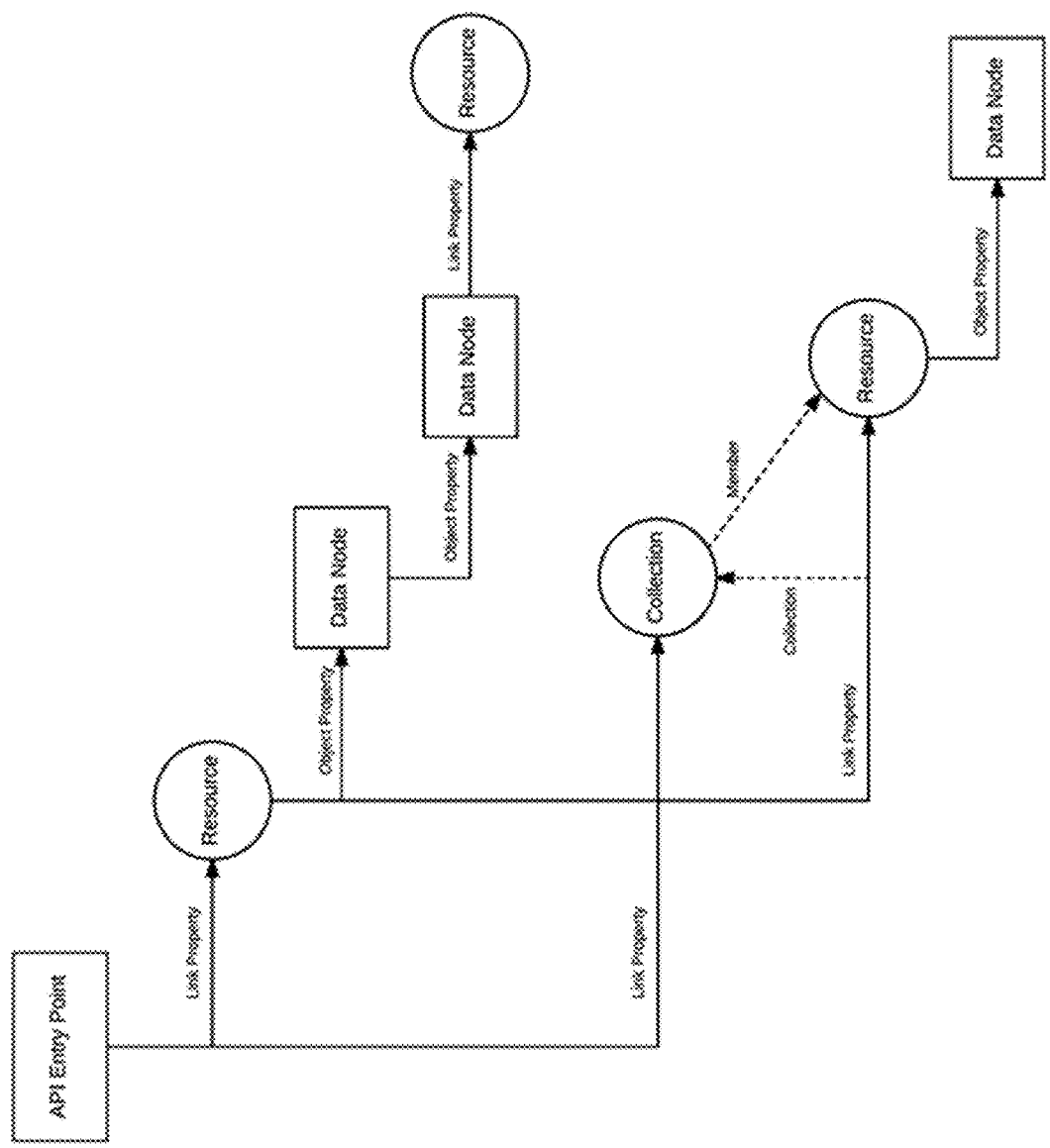
FIG. 6B is an illustration of how the entities in the data model are arranged.

FIG. 6B is an illustration of how the entities in the data model are arranged. In one embodiment, entities in the data model are arranged into a resource graph used to compute the query plan when the information available in API specs is processed by the data model builder component.

As shown in FIG. 6B, the relationship of properties between an API entry point and Resource, Collection, and/or Data nodes is established through link and object properties, and collection/member relations.

Figure 6C:
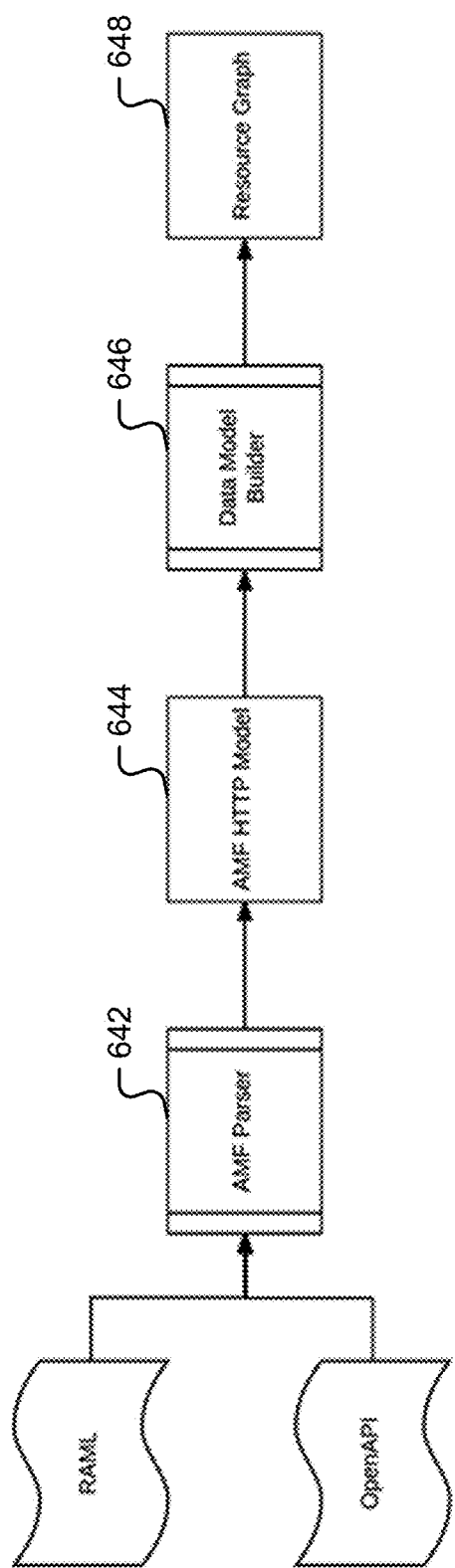
FIG. 6C is an illustration of how AMF provides an abstraction layer that allow work with multiply APIs using the same code base.

FIG. 6C is an illustration of how AMF provides an abstraction layer that allow work with multiply APIs using the same code base. In order to build a graph of entities as shown in FIG. 6B from a data model, APIs such as RAML and OpenAPI specifications may be processed and information about the resources, collections and the links between them extracted.

Without limitation, the example of RAML and OAS are given but the techniques herein may be extended to other APIs. RAML and OpenAPI specifications describe generic HTTP APIs. In this example implementation, the query mechanism without limitation uses REST APIs, a subset of HTTP APIs that follow the architectural principles of the HTTP protocol.

RAML and OpenAPI specifications may also include descriptions of HTTP RPC APIs that are not suitable for the API query mechanism and/or include incomplete or ambiguous description, as REST is not the main concern of these description languages. The data model construction function detailed above describes a generic transformation of a RAML or OpenAPI APIs into the proposed data model for the API query mechanism.

In one embodiment, a set of RAML annotations and OpenAPI extensions are proposed and used to complement RAML and OpenAPI to produce a better description of REST APIs that may be used by the API query mechanism to produce a better data model description to lead to more efficient and expressive queries.

As shown in FIG. 6C, AMF provides an abstraction layer allowing work with both RAML and OAS using the same code base, as RAML and an OpenAPI specification both lead into an AMF parser (642), which leads to an AMF HTTP Model (644), to the data model builder (646), and to a resource graph (648), for example within API metadata handling (424) of FIG. 4A.

The following table summarizes a minimal set of RAML annotations/OAS extensions to support in an API query mechanism:

| Feature | RAML Annotation | OpenAPI Extension |
| --- | --- | --- |
| Domain class | (classTerm) | x-classTerm |
| Domain property | (propertyTerm) | x-propertyTerm |
| Pagination limit | (paginationLimit) | x-paginationLimit |
| Pagination offset | (paginationOffset) | x-paginationOffset |
| Out of band link | (externalLink) | x-externalLink |

Without limitation, below are examples of how an API query engine may map parts of the RAML spec to the proposed data model, including the translation into the AMF data model.

Resource Classes:

| Data Model | AMF Data model | RAML 1.0 |
|---|---|---|
| Definition of a resource | ?endpoint a http:EndPoint ;<br>    hydra:supportedOperation ?op .<br><br>?op hydra:method "get" ;<br>    Hydra:returns ?response .<br><br>?response hydra:statusCode "200" ;<br>    http:payload ?payload .<br>?payload http:schema ?schema . | /path:<br>  get:<br>    responses:<br>      200:<br>        type: |

Resource Shape Restrictions:

| Data Model | AMF Model | RAML 1.0 |
|---|---|---|
| Definition of a data node | a shapes:Shape | type: |
| Data node class | a shapes:NodeShape ;<br>  query:classTerm ?name | type: / (classTerm): |
| Data node property | sh:property / sh:path ;<br>  query:propertyTerm ?name | properties: / (propertyTerm): |
| Mandatory property | sh:minCount = 1 | required: true |
| Property data range | shapes:range [<br>  a shapes:ScalarShape<br>  sh:datatype ?type<br>] | type: (string, number, boolean, ...) |
| Property data node range class | shapes:range [<br>  a shapes:NodeShape<br>  query:classTerm ?name<br>] | property: (classTerm):<br>  type: |

Collection Resources:

| Data Model | AMF Model | RAML 1.0 |
|---|---|---|
| Definition of a collection | a shapes:ArrayShape | /path:<br>  get:<br>    responses:<br>      200:<br>        type: array |

Collection Restrictions:

| Data Model | AMF Model | RAML 1.0 |
|---|---|---|
| Collection managed property | query:propertyTerm | Resource (propertyTerm): |
| Collection member shape | shapes:items | Array Resource<br>  type: [ ]<br>Object Resource<br>  (members): |

-continued

| Data Model | AMF Model | RAML 1.0 |
|---|---|---|
| Collection pagination link | query:limit | (paginationLimit): |
| | query:offset | (paginationOffset): |
| Collection filter link | ?param a | queryParameter: |
| | http: Parameter ; | (propertyTerm): |
| |     http:binding "query" | |
| | ; | |
| |     query:filter | |
| | ?propertyPath | |

Out of Band Hypermedia:

| Data Model | AMF Model | RAML 1.0 |
|---|---|---|
| Out of band link | query:externalLink: | (externalLink): |
| | | propertyTerm: |
| | | spec?: |
| | | resource: |
| | | parameters?: |

GraphQL to API Query Data Graph Mapping.

Without limitation, an example mapping between a graph data model and a REST API model is given that a person having ordinary skill in the art understands may be extensible beyond the specific languages described. For mapping between a GraphQL data model and RESTful APIs, such as specified in API specifications RAML/OpenAPI data model, formalization of API specifications may be used. As GraphQL has no official formal semantics or data model. Without limitation the data model and semantics described in paper "An Initial Analysis of Facebook's GraphQL Language" by Hartig and Perez, which is incorporated herein by reference for all purposes and used as a basis for the GraphQL API model.

This data model is accessible through a unique network endpoint accessible using the HTTP protocol as a transport mechanism and accepting of a declarative query expressed in the GraphQL query language.

For the AMF API model, a RAML/OpenAPI data model as formalised in AMF is distributed through different endpoints accessible using the HTTP protocol uniform interface. Semantics of the AMF data shapes model are defined by the W3C SHACL recommendation, https://www.w3.org/TR/shacl/, which is incorporated herein by reference for all purposes. Both parts of the data model are mapped including the "network model" describing endpoint operations and the "data schema model" describing the schema of the data exposed through the network model.

For model mapping, the data mapping may be used to provide interoperability between GraphQL and RAML/OpenAPI clients to:
  Generate automatically a HTTP facade+matching RAML/OpenAPI spec for a GraphQL endpoint; and/or
  Generate automatically a GraphQL facade+matching GraphQL schema for a RAML/OpenAPI API.

Mapping is accomplished in two step: 1) mapping the "data model" leaving outside the network and operational elements, then 2) re-introducing the network element as a mapping from a particular subset of the GraphQL data model: the set of fields with arguments. Leaving aside the network elements of RAML/OpenAPI the data constraint mechanism both data models introduce are very similar. A mapping between both schema languages shows their common semantics.

The following tables introduce a semantic mapping between GraphQL elements and the AMF classes.

General Shapes Mapping

| GraphQL Model | AMF Model |
|---|---|
| Type | shapes:Shape |
| Scalar | shapes:ScalarShape |
| Object Type | shapes:NodeShape |
| Interface | shapes:NodeShape (only used in inheritance) |
| Field | shapes:PropertyShape |
| List Type | shapes:ArrayShape |
| Union | shapes:UnionShape |

Scalar Mapping.

GraphQL works with a set of scalar types, omitting the ID scalar that is treated in the network model mapping section, that may be mapped to the XSD data types used as the range of AMF ScalarShapes:

| GraphQL Model | AMF Model |
|---|---|
| Int | xsd:integer |
| Float | xsd:float |
| String | xsd:string |
| Boolean | xsd:boolean |

GraphQL enums may be treated as a constraint over the potential values of a AMF ScalarShape in the range of a AMF Property Shape.

Interfaces and Inheritance.

AMF may not explicitly support the GraphQL notion of Interface, because it is not present nor in RAML Types neither in JSON Schema, but they may be mapped into AMF as additional NodeShapes with a special shapes:abstract boolean property set to true. Implementation of a GraphQL Interface by a GraphQL Object type may be mapped as a regular AMF shape inheritance.

| GraphQL Model | AMF Model |
|---|---|
| Interface | shapes:NodeShape (shapes:abstract = true) |
| implements | shapes:inherits |

Fields and Properties.

GraphQL schema language is strongly structural, and Object/Interfaces may be seen as an assignment from the type name to a set of fields. In the same way, AMF NodeShapes (and the underlying RAML object types or JSON Schema objects) may be seen as mappings from shape URIs to sets of PropertyShapes. GraphQL fields may be nullable; this may be mapped to the shapes:minCount restriction of AMF PropertyShapes

| GraphQL Model | AMF Model |
| --- | --- |
| Field | shapes:PropertyShape |
| nullable | shapes:minCount |
| range | shapes:range |

Union and List Types.

Union and list types may be directly mapped to AMF UnionShapes and ArrayShapes and their underlying RAML types and JSON Schema translations.

| GraphQL Model | AMF Model |
| --- | --- |
| Union | shapes:UnionShape |
| List Type | shapes:ArrayShape |

Type Names and URIs.

GraphQL types are identified by plain strings, AMF shapes are identified by a unique URI, and a mapping from GraphQL type names to AMF shape URIs may be obtained using the GraphQL endpoint as the prefix of the URI assigned to the shape mapped from the GraphQL type.

| GraphQL Model | AMF Model |
| --- | --- |
| GraphQL endpoint + GraphQL type name | URI |

GraphQL and RAML/OpenAPI 'RESTful' APIs share a similar data model. One difference between GraphQL and RAML/OpenAPI is that GraphQL does not follow the HTTP architecture where each instance of the type is accessible as a HTTP resource. Instead it provides an RPC invocation mechanism where the full query is executed in the server side.

In order to provide an operational mapping between GraphQL and RAML/OpenAPI that maps a GraphQL service to a RAML/OpenAPI HTTP 'web service' elements are identified in the GraphQL service model to HTTP service model components. This mapping is based on the following identities:
  A GraphQL object type instance identified with an ID is a HTTP resource that may be addressed through a unique URL or a graphQL query using only nested ID fields; and
  A GraphQL field returning an object type identified by a ID is mapped to a HTTP request bound to HTTP method and parameters.

Note that there is a convention in GraphQL called "relay", which standardizes two things: 1) the way to iterate over collections/nodes/edges; and 2) the existence of a node(id: ID) field on the root object. The convention is stable and easily identifiable as there is a relay:boolean field on the root as marker. In one embodiment, these mappings are easier/more powerful for GraphQL APIs that implement the relay convention, as referenced in https://facebook.github.io/relay/docs/graphql-relay-specification.html, which is incorporated herein by reference for all purposes.

To formalize this mapping the data model mapping between GraphQL elements and AMF data shapes is expanded to a mapping from GraphQL elements to the full AMF HTTP model. Note the recursive structure of both models. A tree of nested resources in connected by HTTP operations in the case of RAML/OpenAPI or a tree of nested Object types, starting with the top level Query type, connected by fields with arguments.

General Model Mapping.

The main mapping from elements in both models includes:

| GraphQL Model | AMF Model |
| --- | --- |
| Query type | schema:WebAPI |
| Query type fields with arguments | http:EndPoint / hydra:operations |
| Argument | http Parameter / http:schema |
| Query type fields with arguments range | http:Response / http:payload / http:schema |

Object with IDs.

Object with IDs may be mapped as resources with addressable URLs. At the same time, a HTTP resource in a RAML/OpenAPI API may be seen as the instance of an Object Type accessible through a GraphQL query using only nested ID fields. When exposed through the API, the GraphQL object instance may be identified as a AMF EndPoint with an http:path property.

| GraphQL Model | AMF Model |
| --- | --- |
| Object type Instance with ID | http:EndPoint |
| Path of nested IDs | http:path |

Fields with Arguments.

Fields with arguments may be mapped as HTTP operations with associated parameters and returning payload. A GraphQL service model offers both GET and POST as possible HTTP methods GraphQL clients may use to invoke the query capability, so both mappings may be supported when mapping a GraphQL service to a RAML/OpenAPI spec

| GraphQL Model | AMF Model |
| --- | --- |
| Field with arguments | hydra:Operation |
| Field range | Http:payload / http:schema |

Arguments.

GraphQL arguments may be mapped to RAML/OpenAPI operation parameters with an associated schema. Only scalar types may be used in the parameter schemas.

| GraphQL Model | AMF Model |
| --- | --- |
| Argument | http:Parameter |
| Argument range | http:schema |

URIs/Query Mapping.

As specified, a mapping between HTTP resource URLs and GraphQL IDs in queries is provided. This mapping is done when providing a HTTP facade for a GraphQL API or when providing a GraphQL facade for a HTTP API. One key for this mapping is using the nested tree structure of the API model to produce the value of the ID extracting it from the path template for the endpoint in the HTTP API. At the same time a minimal GraphQL query where only IDs are used in the nested query may be generated to extract the information from a GraphQL service when exposed through an HTTP API. For example the resource url:

http://swapi.org/grahql#/query/droid/{droid_id}
May be mapped to the query:

```
{
    droid(id: droid_id) {
        # all fields for Droid type here
    }
}
```

Recursive Queries.

GraphQL allows recursive queries that may be mapped in a RAML/OpenAPI API as links to the endpoints returning the resource representation for the mapped object types.

Figure 7:
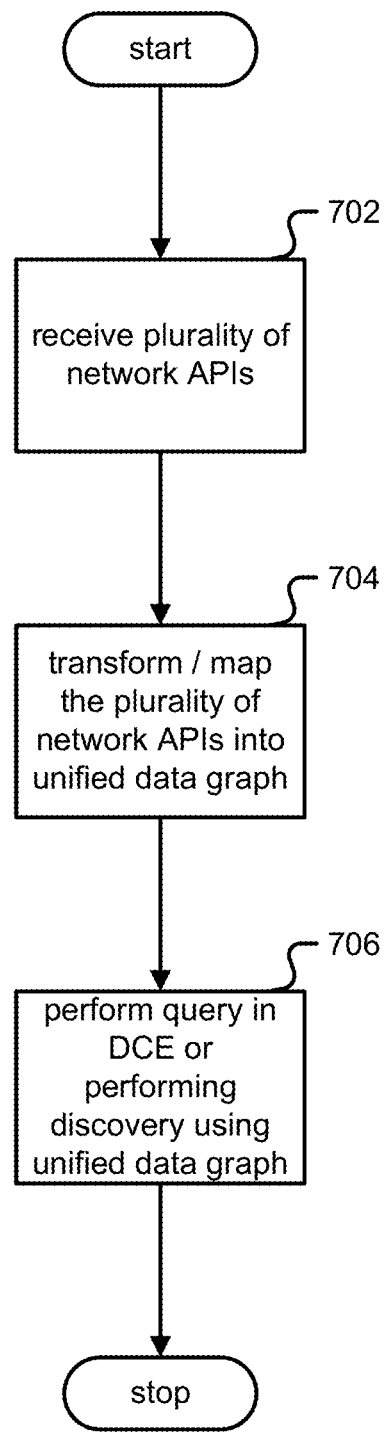
FIG. 7 is a flow chart illustrating an embodiment of a process for an API query engine.

FIG. 7 is a flow chart illustrating an embodiment of a process for an API query engine. In one embodiment, the process of FIG. 7 is carried out by API query engine (232) of FIG. 2D.

In step 702, a plurality of network APIs is received. In one embodiment, the network APIs are RESTful APIs.

In step 704, the plurality of network APIs are transformed and mapped into a unified data graph. In one embodiment, the transformation comprises using a native interface with a standardized mapping mechanism. In one embodiment, the unified data graph comprises at least one of the following: a canonical view of data sources and/or APIs, a unified view of data sources and/or APIs, a federated view of data sources and/or APIs, a normalized view of APIs, and associated protocol information for calling and/or fetching data using APIs. In one embodiment, meta description of each of the plurality of network APIs is processed, for example using at least one of the following: RAML, OpenAPI, GraphQL, and Hydra with TPF.

In one embodiment, a query is received for a network API. In one embodiment, a query is received for a network API, the query is processed for a network API, and one or more of the plurality of network APIs is returned.

In step 706, a query is performed in a distributed computing environment using the unified data graph. Alternately, discovery is performed for at least one of the plurality of network APIs using the unified data graph.

In one embodiment, not shown in FIG. 7, a lifting mechanism with a given network API is used. A "lifting mechanism", as referred to herein, is any process of taking an original data model and a semantics of an input API and lifting it to a target API. Lifting mechanisms include heuristics as described above, and explicit annotation and/or a manual mechanism.

In one embodiment, a discovery request is received for a network API. In one embodiment, a discovery request is received for a network API, the discovery request is processed, and one or more of the plurality of network APIs is returned.

In one embodiment, a query layer is generated that provides a federated and distributed view of the plurality of network APIs. In one embodiment, a query is received, wherein the query is processed using two or more of the plurality of network APIs, and a result of the query is returned.

In one embodiment, a query cost is determined. In one embodiment, this query cost is determined prior to executing a requested query, wherein the query cost comprises a computational complexity measure and/or value. In one embodiment, a query cost is determined and/or an alternative query is suggested. In one embodiment, suggesting this alternative query uses an API designer at least in part to improve an API with a lower query cost.

In one embodiment, a new API is generated for a query request is published. In one embodiment, the query engine is executed in a client, for example a phone. In one embodiment, a visualization view is rendered. In one embodiment, the visualization view is rendered in Tableau.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory; and
   at least one processor coupled to the memory and configured to:
      derive a plurality of filtered endpoints by removing unsafe end points from a plurality of endpoints retrieved from a plurality of application programming interfaces (APIs);
      construct a unified data graph based on the plurality of filtered endpoints, wherein the unified data graph comprises nodes, connections between the nodes, and arguments for each node in the nodes, wherein the arguments are determined based on API specifications provided by the plurality of APIs;
      receive a query in a supported query language; and
      perform the query in a distributed computing environment using the unified data graph by:
         determining at least one API call needed to resolve the query; and
         performing the at least one API call to return a result satisfying the query.

2. The system of claim 1, wherein the unified data graph comprises at least one of the following: a canonical view of the plurality of APIs, a unified view of the plurality of APIs, a federated view of the plurality of APIs, a normalized view of the plurality of APIs, and associated protocol information for fetching data using the plurality of APIs.

3. The system of claim 1, the at least one processor further configured to use a lifting mechanism with a network API in the plurality of APIs.

4. The system of claim 1, the at least one processor further configured to process a meta description of each of the plurality of APIs.

5. The system of claim 1, the at least one processor further configured to process a discovery request for a network API and return one or more APIs in the plurality of APIs.

6. The system of claim 1, the at least one processor further configured to generate a query layer that provides a federated and distributed view of the plurality of APIs.

7. The system of claim 1, wherein to transform the at least one processor is configured to:
   use a native interface with a standardized mapping mechanism.

8. The system of claim 1, the at least one processor further configured to determine a query cost that provides a computational complexity measure.

9. The system of claim 1, the at least one processor further configured to suggest an alternative query.

10. The system of claim 1, the at least one processor further configured to render a visualization view.

11. The system of claim 1, the at least one processor further configured to:

produce an abstract syntax tree that provides a symbolic representation of the query using a lexical processor and a grammar description of a query language associated with the query;

produce an algebraic expression using the abstract syntax tree; and evaluate the algebraic expression to determine the at least one API call.

12. The system of claim 1, the at least one processor further configured to:

construct a query plan that dictates the at least one API call needed to resolve the query and minimizes an execution cost.

13. The system of claim 1, the at least one processor further configured to:

issue a request comprising the at least one API call to an API in the plurality of APIs;

receive a response from the API comprising requested information;

perform a data transformation to the requested information; and produce a document satisfying the query.

14. A method, comprising:

deriving, by one or more processors, a plurality of filtered endpoints by removing unsafe end points from a plurality of endpoints retrieved from a plurality of application programming interfaces (APIs)s;

constructing, by the one or more processors, a unified data graph based on the plurality of filtered endpoints, wherein the unified data graph comprises nodes, connections between the nodes, and arguments for each node in the nodes, wherein the arguments are determined based on API specifications provided by the plurality of APIs;

receiving, by the one or more processors, a query in a supported query language; and performing, by the one or more processors, the query in a distributed computing environment using the unified data graph by:

determining at least one API call needed to resolve the query; and performing the at least one API call to return a result satisfying the query.

15. The method of claim 14, further comprising:

producing, by the one or more processors, an abstract syntax tree that provides a symbolic representation of the query using a lexical processor and a grammar description of a query language associated with the query;

producing, by the one or more processors, an algebraic expression using the abstract syntax; and evaluating, by the one or more processors, the algebraic expression to determine the at least one API call.

16. The method of claim 14, further comprising:

constructing, by the one or more processors, a query plan that dictates the at least one API call needed to resolve the query and minimizes an execution cost.

17. The method of claim 14, further comprising:

issuing, by the one or more processors, a request comprising the at least one API call to an API in the plurality of APIs;

receiving, by the one or more processors, a response from the API comprising requested information;

performing, by the one or more processors, a data transformation to the requested information; and producing, by the one or more processors, a document satisfying the query.

18. The method of claim 14, wherein the unified data graph comprises at least one of the following: a canonical view of the plurality of APIs, a unified view of the plurality of APIs, a federated view of the plurality of APIs, a normalized view of the plurality of network APIs, and associated protocol information for fetching data using the plurality of APIs.

19. A non-transitory computer-readable device having instructions stored thereon that, when executed by at least one computing device, causes the at least one computing device to perform operations comprising deriving a plurality of filtered endpoints by removing unsafe end points from a plurality of endpoints retrieved from a plurality of application programming interfaces (APIs);

constructing a unified data graph based on the plurality of filtered endpoints, wherein the unified data graph comprises nodes, connections between the nodes, and arguments for each node in the nodes, wherein the arguments are determined based on API specifications provided by the plurality of APIs;

receiving a query in a supported query language; and performing the query in a distributed computing environment using the unified data graph by:

determining at least one API call needed to resolve the query; and performing the at least one API call to return a result satisfying the query.

20. The non-transitory computer-readable device of claim 19, the operations further comprising:

producing an abstract syntax tree that provides a symbolic representation of the query using a lexical processor and a grammar description of a query language associated with the query;

producing an algebraic expression using the abstract syntax tree; and evaluating the algebraic expression to determine the at least one API call.

21. The non-transitory computer-readable device of claim 19, the operations further comprising:

constructing a query plan that dictates the at least one API call needed to resolve the query and minimizes an execution cost.

22. The non-transitory computer-readable device of claim 19, the operations further comprising:

issuing a request comprising the at least one API call to an API in the plurality of APIs;

receiving a response from the API comprising requested information;

performing a data transformation to the requested information; and producing a document satisfying the query.

23. The non-transitory computer-readable device of claim 19, wherein the unified data graph comprises at least one of the following: a canonical view of the plurality of APIs, a unified view of the plurality of APIs, a federated view of the plurality of APIs, a normalized view of the plurality of APIs, and associated protocol information for fetching data using the plurality of APIs.

* * * * *